(12) United States Patent
Chen et al.

(10) Patent No.: US 7,324,555 B1
(45) Date of Patent: Jan. 29, 2008

(54) STREAMING WHILE FETCHING BROADBAND VIDEO OBJECTS USING HETEROGENEOUS AND DYNAMIC OPTIMIZED SEGMENTATION SIZE

(75) Inventors: Monsong Chen, Katonah, NY (US); Bodhi Mukherjee, Hopewell Jn, NY (US); Dah-Weih Duan, Torrance, CA (US)

(73) Assignee: Infovalue Computing, Inc., Elmsford, NY (US)

( * ) Notice: Subject to any disclaimer, the term of this patent is extended or adjusted under 35 U.S.C. 154(b) by 853 days.

(21) Appl. No.: 10/804,658

(22) Filed: Mar. 19, 2004

Related U.S. Application Data

(60) Provisional application No. 60/456,099, filed on Mar. 20, 2003, provisional application No. 60/456,098, filed on Mar. 20, 2003, provisional application No. 60/456,096, filed on Mar. 20, 2003.

(51) Int. Cl.
*H04J 3/22* (2006.01)

(52) U.S. Cl. .......................... 370/468; 725/74; 725/105

(58) Field of Classification Search ................ 370/229, 370/235, 395.21, 395.41; 725/32, 145
See application file for complete search history.

(56) References Cited

U.S. PATENT DOCUMENTS

| | | | |
|---|---|---|---|
| 5,550,577 A | 8/1996 | Verbiest et al. ................. | 348/7 |
| 5,608,448 A | 3/1997 | Smoral et al. .................. | 348/7 |
| 5,737,747 A | 4/1998 | Vishlitzky et al. .......... | 711/118 |
| 5,805,821 A | 9/1998 | Saxena et al. ......... | 395/200.61 |
| 5,822,603 A | 10/1998 | Hansen et al. ......... | 395/800.01 |
| 5,926,649 A | 7/1999 | Ma et al. ..................... | 395/826 |
| 5,930,473 A | 7/1999 | Teng et al. ............ | 395/200.34 |
| 5,933,603 A | 8/1999 | Vahalia et al. ......... | 395/200.55 |
| 5,936,659 A | 8/1999 | Viswanathan et al. ......... | 348/7 |
| 5,973,679 A | 10/1999 | Abbott et al. ................ | 345/302 |
| 5,996,015 A | 11/1999 | Day et al. .................... | 709/226 |
| 6,018,359 A * | 1/2000 | Kermode et al. ........... | 725/101 |
| 6,061,504 A | 5/2000 | Tzelnic et al. ......... | 395/200.49 |
| 6,088,721 A | 7/2000 | Lin et al. ..................... | 709/214 |
| 6,101,546 A | 8/2000 | Hunt .......................... | 709/231 |

(Continued)

OTHER PUBLICATIONS

"Network Caching Guide," Gould, Patricia Seybold Group for Inktomi Corp., Boston, MA, Mar. 1999, pp. 1-41.

(Continued)

*Primary Examiner*—Chi Pham
*Assistant Examiner*—Phuc Tran
(74) *Attorney, Agent, or Firm*—Saile Ackerman LLC; Stephen B. Ackerman; Billy Knowles

(57) ABSTRACT

An video data object distribution system for transfer of video data objects includes a network of digital data file servers. The network of digital data file servers communicate with a client system to transfer video data objects. A scheduling apparatus schedules the transfer of the video data objects. A client streaming device within the client begins transfer of a first segment such that the video data object is started streaming of prior to reception of a totality of the first segment. An ordered sequential transfer device orders and sequentially transfers segments of the video data object to the client system. The preemption device allows persistent video data object transfer of video data object without resending the video data objects. A hierarchical caching controller copies segments of any of the video data objects from a central distribution server to any of the network of data file servers.

20 Claims, 10 Drawing Sheets

U.S. PATENT DOCUMENTS 6,333,750 B1 * 12/2001 Odryna et al. ............... 345/629
7,143,433 B1 * 11/2006 Duan et al. ................. 725/115
2003/0093790 A1 * 5/2003 Logan et al. ................. 725/38

OTHER PUBLICATIONS

"Inktomi Traffic Server—Media Cache Option," Inktomi Corp., San Mateo, CA, 1999 found http://www.inktomi.com, Aug. 15, 2000.

"Implementing Multiplexing, Streaming, and Server Interaction for MPEG-4," Kalva et al., IEEE Trans. on Circuits and Systems for Video Tech., vol. 9, No. 8, Dec. 1999, pp. 1299-1312.

"API Overview," Inktomi Corp., San Mateo, CA, 2000, found http://www.inktomi.com/products/network/traffic/tech/wccp, pp. 1-6, Aug. 15, 2000.

"Optimal Scheduling of Secondary Content for Aggregation in Video-on-Demand Systems", Basu et al., Boston Univ., MCL Tech., Report No. 12-16-1998, pp. 1-24.

"New Solution for Transparent Web Caching: Traffic Server 2.1 Supports WCCP," Inktomi Corp., San Mateo, CA, 2000, found http://www.inktomi.com/products/network/traffic/tech/WCCP, Aug. 15, 2000, pp. 1-4.

"Web Cache Communication Protocol V2", Cisco Systems, Inc., San Mateo, CA, 2000 found http://www.cisco.com/univered/cc/td/doc/product/software/ios120/120newft/120t/120t3/wccp.htm, Aug. 15, 2000, pp. 1-33.

"A Practical Methodology for Guaranteeing Quality of Service for Video-on-Demand", Zamora et al., IEEE Trans. on Circuits & Sys. for Video Tech. vol. 10, No. 1, Feb. 2000, pp. 166-178.

* cited by examiner

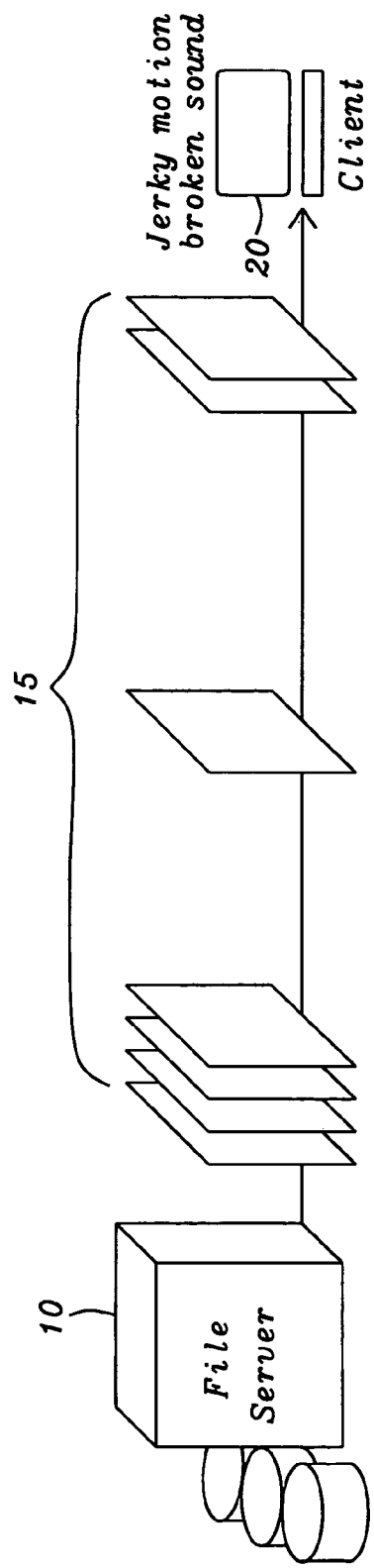
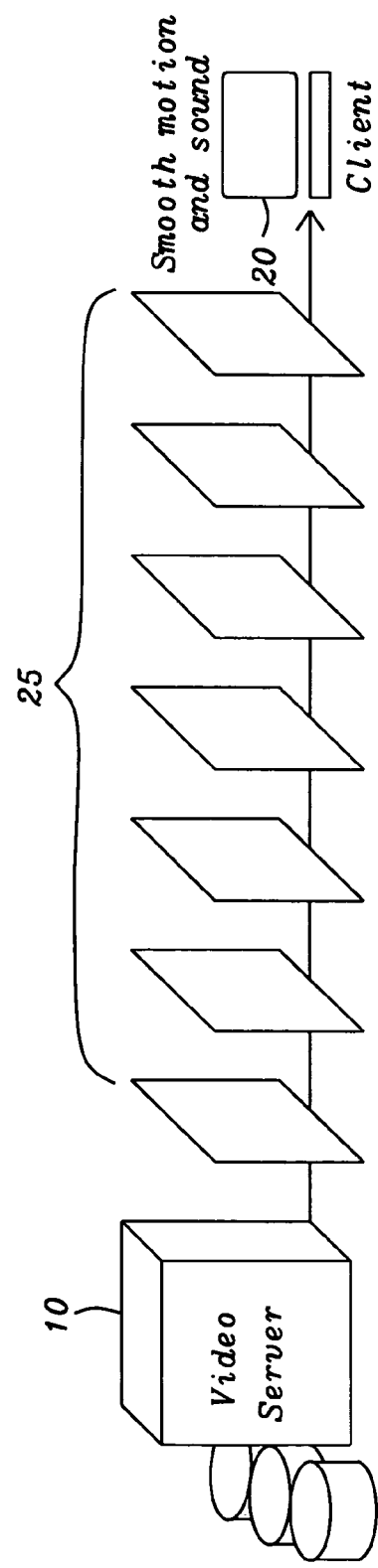
FIG. 1 – Prior Art
FIG. 2 – Prior Art

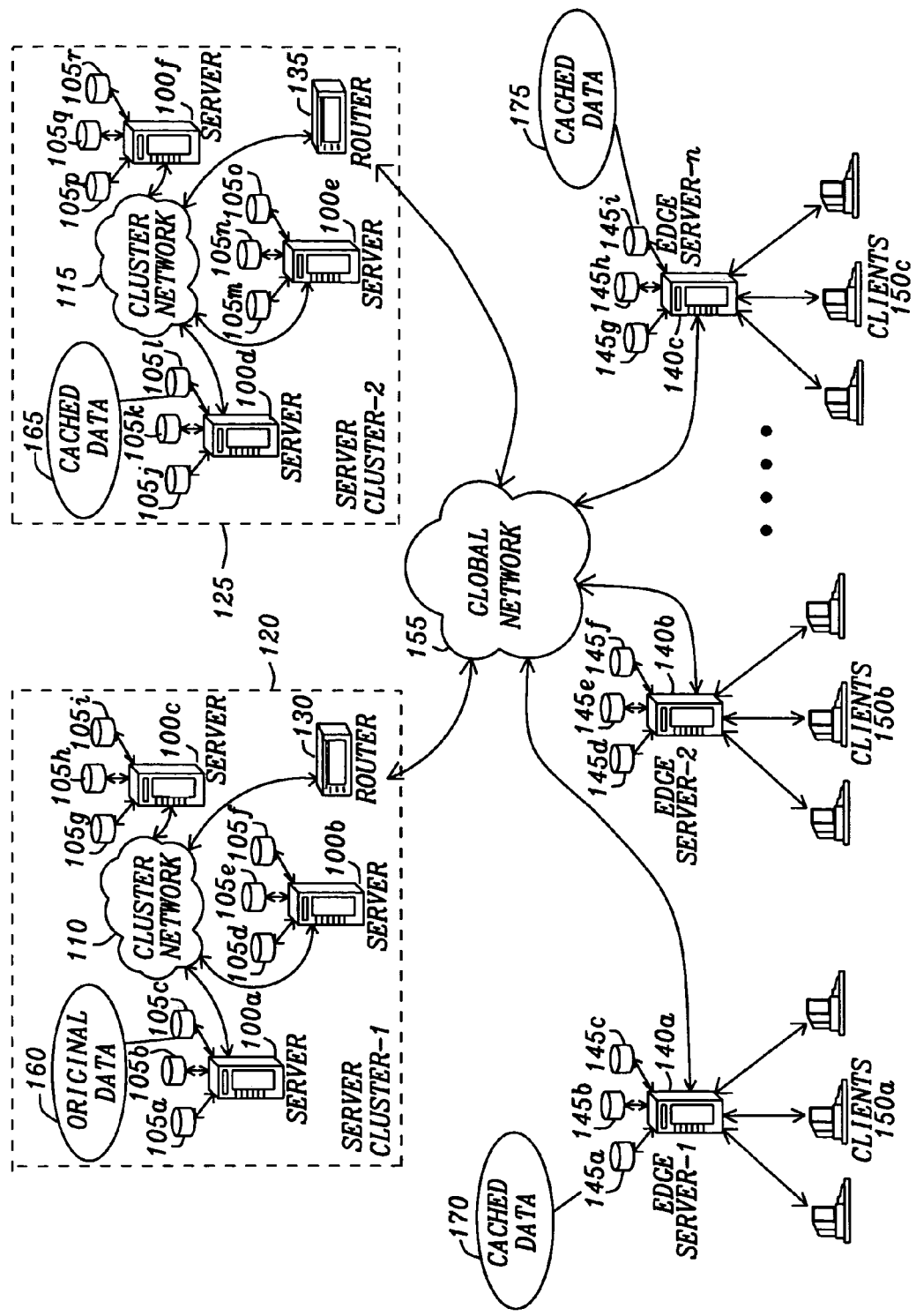
FIG. 3 – Prior Art

STREAMING WHILE FETCHING BROADBAND VIDEO OBJECTS USING HETEROGENEOUS AND DYNAMIC OPTIMIZED SEGMENTATION SIZE

This application claims priority to U.S. Provisional Patent Application Ser. No. 60/456,099, Filing Date Mar. 20, 2003 and U.S. Provisional Patent Application Ser. No. 60/456,096, Filing Date Mar. 20, 2003, which are herein incorporated by reference.

RELATED PATENT APPLICATIONS

"A Hardware Independent Hierarchical Cluster of Heterogeneous Media Servers Using a Hierarchical Command Beat Protocol to Synchronize Distributed Parallel Computing Systems and Employing A Virtual Dynamic Network Topology for Distributed Parallel Computing System," U.S. Provisional Patent Application Ser. No. 60/456,098, filed on Mar. 20, 2003.

"A Video Distribution System Using Segments," Ser. No. 09/748,442, Filing Date Dec. 27, 2001, assigned to the same assignee as this invention.

"A Video Distribution System Using Dynamic Segmenting of Video Files," Ser. No. 09/748,304, Filing Date Dec. 27, 2001, assigned to the same assignee as this invention.

"A Video Distribution System Using Disk Load Balancing by File Copying," Ser. No. 10/025,242, Filing Date Dec. 19, 2001, assigned to the same assignee as this invention.

"A Video Distribution System Using Dynamic Disk Load Balancing with Variable Segmenting," Ser. No. 10/027,991, Filing Date Dec. 20, 2001, assigned to the same assignee as this invention.

BACKGROUND OF THE INVENTION

1. Field of the Invention

This invention relates to the field of broadcasting quality video data over a packet switched network in such a way that the video is played in a smooth (not jerky) manner.

2. Description of Related Art

In the past video streaming servers required that a file be fully present before the server could start streaming the file. This imposed a considerable restriction as typical DVD or broadcast quality videos may be several Gigabytes in size and thus imposed a large latency before a viewer could start viewing a video.

Video is the most dominant medium in entertainment and is rapidly becoming a critical part of computing as well. Video is often used in CD-ROM titles, for example, to mimic personal or virtual environments, increasing an application's appeal and usability. Video has a large information carrying capacity and is heavily used in capturing and conveying complicated situations such as news events, live interviews, scientific experiments, tourist attractions, and many others.

With the increasing availability of high bandwidth networks, video on-demand applications are gaining popularity on global digital communications networks such as the Internet as well as private and corporate digital communication internal networks commonly referred to as Intranets. Example applications include online training, news broadcasts, educational programming, corporate information, and virtual seminars directly to every desktop computing system or workstation. Similarly, video kiosks can be set up in enterprises and university campuses to display live video and up-to-the-minute news, without ever needing an on-site upgrade.

Video files, however, occupy huge amounts of space on computers. It requires about 10 MB to store one minute of video in most standard compression and decompression video formats, including Motion Picture Experts Group standard MPEG-1, the Apple Computer Inc. Indeo, Intel Corp. QuickTime, and Super Mac, Inc Cinepak. That translates into 1.2 GB of space for two hours of video, the length of an average feature film. These tremendous storage requirements make effective on-demand sharing of video files at least as important as conventional file sharing.

However, conventional file servers do not address video's unique requirements and cannot effectively support video sharing. Full-motion video, inherited from analog TV, is a sequence of images played out at constant intervals. The two most common analog video formats are the National Television Standards Committee (NTSC), used in the United States and Japan, and Phase Alternation Standard (PAL), used in Europe. NTSC plays video at 30 frames per second, while PAL plays it at 25 frames per second. The sequence of images in a video clip must be relayed at a constant interval, or else the perceptual quality degrades rapidly: the motion jumps and the sound breaks. This rigid periodic timing property is referred to as the isochronous requirement. Referring now to FIG. 1, conventional file servers 10 are designed for minimal transfer latency. Files 15 are thus transferred to maintain the minimum latency and are transferred as quickly as possible. The files 15 will be interleaved with other digital communication traffic on the network and thus non-isochronously. Without explicit mechanisms to ensure isochronism, delivery rates are irregular, resulting in erratic playback quality at the client computing system 20:

To avoid erratic playback, the usual approach is to download whole files 15 from the server 10 to the client computing system 20 before starting video playback. This approach results in unacceptable delays for most video files, which are large. For example, even with transfer rates as fast as 1.5 Mb/second, the initial start-up delay is 60 seconds for a one minute video clip.

It is thus desirable to deliver video streams isochronously, as depicted in FIG. 2, so that video playback is guaranteed to have smooth motion and sound. The file server 10 must now transfer or stream the files 25 such that the time between each section of the file is transferred at a period of time $\tau$ The even interval allows the file 25 to arrive isochronously with the first section to be displayed before any of the remaining sections of the file 25 have arrived at the client system 20. This allows a video clip to begin practically instantaneously.

The rapid advances in the speeds of microprocessors, storage, and network hardware may give a false impression that video on-demand (VOD) solutions do not need special purpose video streaming software. Video streaming as shown in FIG. 2 allows efficient playback of full motion videos over networks with guaranteed quality using isochronous timing.

When an operating system's default file transfer mode is used to stream a video file, faster hardware may accelerate the operating system's transfer rate, but this improved hardware still cannot change the fundamental, erratic behavior of a file transfer as shown in FIG. 1. By default, the file transfer process does not respect the isochronous nature of a video stream. This typically results in a jerky and poor-quality playback of a video stream. The dominant factors of a system's overall streaming performance are the higher level client/server and networking processes, and are not the raw power of the low level physical devices. For example, it is known in the art that there is a ceiling of 160 Mbps (bits per second) aggregate file transfer throughput for Windows NT and Pentium combination, even though the underlining networks are 100 Mbps Fast Ethernet or faster.

When an application at a Windows client accesses a file in a Windows NT server, the data are automatically cached by WFS at both Windows client and Windows NT server. This is a commonly used technique for reducing the amount of disk access when the cached data can be reused by subsequent requests. This technique does not work for most video-on-demand applications for two reasons. The first reason is that the cached data is hardly used again. VOD applications have very low "locality profile" because they tend to have high data rate and massive volume of videos for users' interactive playback. The second reason is that the constant video caching leads to intensive memory paging and, thus, severally limits performance.

U.S. Pat. No. 6,101,546 (Hunt) describes a method and system for providing data files that are partitioned by delivery time and data type. A file is logically partitioned into data channels where each data channels hold a sequence of data of a particular data type. The data channels are logically partitioned into delivery times. The format of the file explicitly sets forth the synchronization between the data channels and the delivery times of data held within the channels. The file format is especially well adapted for use in a distributed environment in which the file is to be transferred from a server to a client. Channel handlers are provided at the client to process respective data channels in the file. The channel handlers are data type specific in that they are constructed to process data of an associated data type. The data in the file may be rendered independently of the delivery time of the data.

U.S. Pat. No. 6,018,359 (Kermode, et al.) illustrates a system and method for multicast video-on-demand delivery system. The video-on-demand system divides video files into sequentially organized data segments for transmission and playback. Each segment is repeatedly transmitted in a looping fashion over a transmission channel. The rate of transmission is equal to or greater than the playback rate, and the lengths of the segments are chosen such that:

1. the receiver tunes into no more than a fixed number of channels (preferably two) at any one time;
2. the receiver tunes into a new channel only after an entire segment has been received from a previous channel; and
3. until a maximum segment length is attained, data is received from no fewer than two channels.

The segments are sequentially presented even as new segments are being downloaded. When the display rate is equal to the transmission rate, it is found that the foregoing conditions are satisfied when the relative lengths of the segments form a modified Fibonacci sequence.

U.S. Pat. No. 5,930,473 (Teng, et al.) discloses a video application server for mediating live video services. The video application server is to be used in a network including source clients and viewer clients connected to one or more shared transmission media. A video server is connected to one of the transmission media and is operative to control the broadcast and storage of multiple live or previously-stored video streams. The control may be provided via remote procedure call (RPC) commands transmitted between the server and the clients. In one embodiment, a video presentation system is provided in which a video stream from a source client is continuously broadcast to a number of viewer clients. One or more of the viewer clients may be authorized by the source client to broadcast an audio and/or video stream to the other clients receiving the source video stream. In another embodiment, a multicast directory is provided to each of a plurality of viewer clients by transmitting directory information in a packet corresponding to a predetermined multicast address. The multicast directory indicates to a particular viewer client which of a number of video programs are available for broadcast to that client.

U.S. Pat. No. 5,805,821 (Saxena, et al.) teaches a video optimized media streamer user interface employing non-blocking switching to achieve isochronous data transfers. The media streamer includes at least one control node; a user interface having an output coupled to the at least one control node; at least one storage node for storing a digital representation of at least one video presentation; and a plurality of communication nodes each having an input port for receiving a digital representation of at least one video presentation there from. The video presentation requires a time T to present in its entirety, and is stored as a plurality of N data blocks. Each data block stores data corresponding to a T/N period of the video presentation. Each communication nodes further has a plurality of output ports for outputting a digital representation. A circuit switch is connected between the at least one storage node and the input ports of communication nodes for coupling one or more input ports to the at least one storage node. The user interface includes a capability for specifying commands for execution, and the at least one control node is responsive to individual ones of the commands for controlling at least one of the at least one storage node and at least one of the plurality of communication nodes, in cooperation with the circuit switch, so as to execute a function associated with individual ones of the commands. The commands may include video cassette recorder-like commands that include commands selected from a group that includes a Load command, an Eject command, a Play command, a Slow command, a Fast Forward command, a Pause command, a Stop command, a Rewind command, and a Mute command. The commands may also include commands selected from a group that includes a Play List command, a Play Length command, and a Batch command. A synchronous application program interface (API) is provided for coupling, via the user interface, a user application program to the at least one control node. The API includes Remote Procedure Call (RPC) procedures.

U.S. Pat. No. 5,550,577 (Verbiest, et al.) illustrates a video on demand network, including a central video server and distributed video servers with random access read/write memories. The video on demand network transmits video signals to user stations pursuant to the receipt of control signals issued by these user stations. In order to optimize the retrieval costs, this video on demand network maintains a large video library in a central video server and stores locally popular video signals in a plurality of local distributed video servers from which the latter video signals are transmitted to the user stations. The video signals provided by the local distributed servers are updated from the central server based upon the changing popularity of the video signals. The video on demand network of Verbiest proposes in particular to store the video signals in the local distributed servers in random access read/write memories, e.g., electronic RAMs, magnetic or optical disks from which the video signals can flexibly be supplied on-line to the user stations and to store the video signals in the central server in sequential access memories, e.g. Digital Audio Tapes (DAT) and CD-ROMs (CDR), providing cheap mass storage.

U.S. Pat. No. 5,933,603 (Vahalia, et al.) teaches a video file server maintaining sliding windows of a video data set in random access memories of stream server computers for immediate video-on-demand service beginning at any specified location. The video file server includes an integrated cached disk array storage subsystem and a plurality of stream server computers linking the cached disk storage subsystem to a data network for the transfer of video data streams. The video file server further includes a server controller for applying an admission control policy to client requests and assigning stream servers to service the client requests. The stream servers include a real-time scheduler for scheduling isochronous tasks, and supports at least one industry standard network file access protocol and one file access protocol for continuous media file access. The cached disk storage subsystem is responsive to video prefetch commands, and the data specified for a prefetch command for a process are retained in an allocated portion of the cache memory from the time that the cached disk storage subsystem has responded to the prefetch command to the time that the cached disk storage subsystem responds to a fetch command specifying the data for the process. The time between prefetching and fetching is selected based on available disk and cache resources. The video file server provides video-on-demand service by maintaining and dynamically allocating sliding windows of video data in the random access memories of the stream server computers.

U.S. Pat. No. 5,822,603 (Hansen, et al.) describes a high bandwidth media processor interface for transmitting data in the form of packets with requests linked to associated responses by identification data. The media processor processes and transmits a media data stream of audio, video, radio, graphics, encryption, authentication, and networking information in real-time.

U.S. Pat. No. 5,737,747 (Vishlitzky, et al.) describes a video file server for prefetching to service multiple video streams from an integrated cached disk array. A video file server includes an integrated cached disk array storage subsystem and a plurality of stream server computers linking the cached disk storage subsystem to the data network for the transfer of video data streams. The video file server further includes a controller server for applying an admission control policy to client requests and assigning stream servers to service the client requests. The stream servers include a real-time scheduler for scheduling isochronous tasks, and supports at least one industry standard network file access protocol and one file access protocol for continuous media file access. The cached disk storage subsystem is responsive to video prefetch commands, and the data specified for a prefetch command for a process are retained in an allocated portion of the cache memory from the time that the cached disk storage subsystem has responded to the prefetch command to the time that the cached disk storage subsystem responds to a fetch command specifying the data for the process. The time between prefetching and fetching is selected based on available disk and cache resources. The video file server provides video-on-demand service by maintaining and dynamically allocating sliding windows of video data in the random access memories of the stream server computers.

"Performance Evaluation of QuickVideo OnDemand (QVOD) Server," InfoValue Computing, Inc. Technical Report IV-TR-QVOD-1999-07-1-1, Jul. 8, 1999, InfoValue Computing, Inc., Elmsford, N.Y. describes a video on-demand system developed for high performance, effective and flexible, network-based, on-demand sharing of videos. QuickVideo OnDemand provides streaming throughput for broadband applications Further, QuickVideo OnDemand allows a linearly scalable clustering mechanism which provides support for higher throughputs, if required. QuickVideo OnDemand supports all video formats, codecs, networks and applications, and is compatible with any open application platform.

"Network Video Computing Via QuickVideo Suite," InfoValue Technical White Paper, InfoValue Computing, Inc., Elmsford, N.Y., 1999, describes Network Video Computing the core of which is video streaming. Video streaming allows the efficient playing of full-motion video content over networks with guaranteed quality. The rigid timing property of full motion video is referred to as the isochronous timing. File servers are designed to minimize transfer latency during conventional network transfers, and are insensitive to video's unique timing requirement. As a result, delivery rates are irregular and produce erratic playback as described above. Video streaming technologies are real-time network transfers that maintain the video's critical timing property throughout the entire delivery period, as depicted in FIG. 2. This white paper describes an open architecture with a streaming core.

"Web Distribution Systems: Caching and Replication" Chandbok, Ohio State University, 1999, found http://www.cis.ohio-state.edu/~jain/cis788-99/web_caching/index.html, Aug. 15, 2000, provides an overview of the current techniques for caching and replication of digital data on computer systems interconnected through a global or local digital communication network. Refer now to FIG. 3 for a summary of caching in large distributed digital processing networks. Multiple server computing systems 100*a*, 100*b*, . . . , 100*f* are high performance computing systems such as the IBM Corporation RS-6000-SP, The Sun Microsystems, Inc. Enterprise 10000 Server, the Hewlett-Packard Netserver M-6200, or other server systems. The computer systems 100*a*, 100*b*, . . . , 100*f* are each connected to multiple storage devices 105*a*, 105*b*, . . . , 105*r*. The storage devices 105*a*, 105*b*, . . . , 105*r* are magnetic disk devices, compact disk read only memory (CD-ROM) "juke boxes," or tapes drives. A group of the server systems 100*a*, 100*b*, 100*c* or 100*d*, 100*e*, 100*f* are respectively interconnected through the digital communications cluster network 110 and 115 to form the server cluster 1 120 and the server cluster 2 125. The server cluster 1 120 and the server cluster 2 125 may be resident with in the same enterprise data center or placed at different geographical locations either within the enterprises or even in different enterprises.

The cluster networks 110 and 115 are connected respectively to the network routers 130 and 135. The network routers 130 and 135 are further connected to a public or global digital communications network 155. The global network 155 may be the public Internet or an enterprise's private Intranet.

The server computer systems 100*a*, 100*b*, . . . , 100*f* contain database information systems, storage for files such as audio or video files, and other data files to accessed by large numbers of people either publicly or privately within an enterprise through the client systems 150*a*, 150*b*, 150*c*.

Edge servers 140*a*, 140*b*, 140*c* are connected to the global network 155 and thus provide access portals for the client systems 150*a*, 150*b*, 150*c* to the global network 155 to communicate with each other, with other edge servers 140*a*, 140*b*, 140*c*, or with the server computer systems 100*a*, 100*b*, . . . , 100*f*. Each edge servers 140*a*, 140*b*, 140*c* is connected has attached data storage device 145*a*, 145*b*, . . . , 145*i*. The attached data storage device 145*a*, 145*b*, . . . , 145*l* is generally a magnetic disk storage device, but may also include a CD-ROM, magnetic tape, or other storage media.

If a server computer systems 100*a*, 100*b*, . . . , 100*f* has data 160 that is requested by many of the client systems 150*a*, 150*b*, 150*c*, the network traffic to the server computer system 100*a* may too great for either the global network 155 or the cluster network 110 to carry and maintain a reasonable quality of service. Quality of service in this context means that the original data 160 is transferred repetitively relatively quickly and if the original data 160 is audio or video files, that the isochronous nature of the transfer of the data is maintained.

If the server clusters 120 and 125 are separated geographically, it may cost less to maintain the quality of service by placing a copy 165 of the original data 160 in a disk 105*l* on a second server system 100*d*. If the copy 165 of the original data 160 is permanent, it is referred to as being replicated. If the copy 165 of the original data 160 is temporary it is referred to as cached. As the demand for the original data 160 is increased, it may be desirable to either replicate or cache 170 or 175 the data even within the disks 145*a* or 145*i* of the edge servers 150*a* or 150*c*.

There are many policies developed regarding which of the original data 160 is replicated or cached 165, 170, or 175. Further, the replacement of cached data 165, 170, or 175 by other data that is demanded more often is known and generally follows a least recently used protocol, where the cached data 165, 170, or 175 that has not been requested is replaced by that is more requested.

U.S. Pat. No. 6,088,721 (Lin, et al.) teaches an efficient unified replication and caching protocol. The protocol provides assurance of consistent replication of objects from a central server to caching servers, for example, over data communication networks such as the Internet. It is an application-layer protocol which guarantees delivery of objects such as files. This protocol insures that objects sent by a source machine such as a server to any number of destination machines such as caching servers actually arrive at the intended caching servers even when the caching servers are temporarily unavailable, for example, due to failure or network partition.

U.S. Pat. No. 6,061,504 (Tzelnic, et al.) illustrates a video file server using an integrated cached disk array and stream server computers. The video file server includes an integrated cached disk array storage subsystem and a multiple stream server computers linking the cached disk storage system to the data network for the transfer of video data streams. The video file server further includes a controller server for applying an admission control policy to client requests and assigning stream servers to service the client requests. The stream servers include a real-time scheduler for scheduling isochronous tasks, and supports at least one industry standard network file access protocol such as Simple Network Management Protocol (SNMP) and one file access protocol Network File System (NFS) for continuous media file access. The cached disk storage subsystem is responsive to video prefetch commands, and the data specified for a prefetch command for a process are retained in an allocated portion of the cache memory from the time that the cached disk storage subsystem has responded to the prefetch command to the time that the cached disk storage subsystem responds to a fetch command specifying the data for the process. The time between prefetching and fetching is selected based on available disk and cache resources. The video file server provides video-on-demand service by maintaining and dynamically allocating sliding windows of video data in the random access memories of the stream server computers.

"Network Caching Guide," Goulde, Patricia Seybold Group for Inktomi Corp., Boston, Mass., March 1999, describes the various types of caching approaches and the different ways for caches to be implemented. Implementations vary depending on where the cache is placed, who is accessing the cache, and the quantity and type of content that is being cached. Goulde describes the Inktomi Traffic Server from Inktomi Corporation. The Inktomi Traffic Server is capable of delivering fresh content to large numbers of users around the world from a large number of Web servers around the world.

"Inktomi Traffic Server—Media Cache Option", Inktomi Corporation, San Mateo Calif., 1999, found http://www.inktomi.com, Aug. 15, 2000, describes the caching option for the Inktomi Traffic Server to support streaming of video data files.

"Implementing Multiplexing, Streaming, and Server Interaction for MPEG-4" Kalva et al., IEEE Transactions On Circuits And Systems For Video Technology, Vol. 9, No. 8, December 1999, pp. 1299-1312, describes the implementation of a streaming client-server system for object-based audio-visual presentations in general and MPEG-4 content in particular. The system augments the MPEG-4 demonstration software implementation (IM1) for PC's by adding network-based operation with full support for the Delivery Multimedia Integration Framework (DMIF) specification, a streaming PC-based server with DMIF support, and multiplexing software. The MPEG4 server is designed for delivering object-based audio-visual presentations. The system also implements an architecture for client-server interaction in object-based audio-visual presentations, using the mechanism of command routes and command descriptors.

"Optimal Scheduling of Secondary Content for Aggregation in Video-on-Demand Systems," Basu et al., Boston University, MCL Technical Report No. 12-16-1998 describes dynamic service aggregation techniques that can exploit skewed access popularity patterns to reduce the costs of building interactive VoD systems. These schemes seek to cluster and merge users into single streams by bridging the temporal skew between them, thus improving server and network utilization. Rate adaptation and secondary content insertion are two such schemes. Basu et al. presents and evaluate an optimal scheduling algorithm for inserting secondary content in this scenario.

"New Solution for Transparent Web Caching: Traffic Server 2.1 Supports WCCP," Inktomi Corporation, San Mateo Calif., 2000, found http://www.inktomi.com/products/network/traffic/tech/wccp, Aug. 15, 2000 describes the use of the Web Cache Control Protocol (WCCP) from Cisco Systems, Inc. within Inktomi Corporation's Traffic Server.

"API Overview," Inktomi Corporation, San Mateo Calif., 2000, found http://www.inktomi.com/products/network/traffic/tech/wccp, Aug. 15, 2000, describes the application program interface tools that are available for the Inktomi Corporation's Traffic Server which allow customization or the Traffic Server's event processing thus allowing manipulation of hypertext transaction protocol (HTTP) transactions at any point in their lifetime.

"Web Cache Communication Protocol v2" Cisco Systems, Inc., San Jose, Calif., found http://www.cisco.com/univercd/cc/td/doc/product/software/ios120/120newft/120t/120t3/wccp.htm, Aug. 15, 2000, describes the protocol that allows the use a Cisco Cache Engine to handle web traffic, reducing transmission costs and downloading time. This traffic includes user requests to view pages and graphics on World Wide Web servers, whether internal or external to a network, and the replies to those requests. When a user requests a page from a web server (located in the Internet), the router sends the request to a cache engine. If the cache engine has a copy of the requested page in storage, the cache engine sends the user that page. Otherwise, the cache engine retrieves the requested page and the objects on that page from the web server, stores a copy of the page and its objects, and forwards the page and objects to the user. WCCP transparently redirects Hypertext Transfer Protocol (HTTP) requests from the intended server to a cache engine.

"A Practical Methodology For Guaranteeing Quality Of Service For Video-On-Demand," Zamora et al., IEEE Transactions On Circuits And Systems For Video Technology, Vol. 10, No. 1, February 2000, describes an approach for defining end-to-end quality of service (QoS) in video-on-demand (VoD) services. A schedulable region for a video server which guarantees end-to-end QoS, where a specific QoS required in the video client translates into a QoS specification for the video server. The methodology is based on a generic model for VoD services, which is extendible to any VoD system. In this kind of system, both the network and the video server are potential sources of QoS degradation. The effects that impairments in the video server and video client have on the video quality perceived by the end user is examined.

As described above, video files may be very large, on the order of 1.2 GB for a two hour movie or video presentation. In the digital communication networks 110, 115, and 155 of FIG. 3, the files are generally formed into data packets for transfer. These data packets may not arrive to a designated client system 150a, 150b, 150c in correct order for processing. This requires reception of the complete file before processing may begin. If the file is an audio or video file requiring isochronous presentation of the file, the files must be totally received before processing or the files must be segmented or partitioned into portions to allow smaller units of the files to be processed.

U.S. Pat. No. 5,926,649 (Ma, et al.) teaches a Media server for storage and retrieval of voluminous multimedia data. The Media server provides storage and retrieval of multiple data streams in a multimedia distribution system. A given data stream is separated into a plurality of portions, and the portions are stored in a multi-disk storage system with Y disks each having X zones such that the ith portion of the given stream is stored in zone (i mod X) of disk (i mod Y). The number X of zones per disk and the number Y of disks are selected as relatively prime numbers. The stored data are retrieved using Y independent retrieval schedulers which are circulated among the Y disks over a number of scheduling intervals. Each retrieval scheduler processes multiple requests separated into X groups, with the requests of each group accessing the same disk zone during a given scheduling interval. The retrieval schedulers are also configured such that the retrieval requests of a given retrieval scheduler access the same disk during a given scheduling interval. The data stream placement technique in conjunction with the retrieval schedulers provide sequential-like parallel retrieval suitable for supporting real-time multimedia data distribution for large numbers of clients.

U.S. Pat. No. 5,936,659 (Viswanathan, et al.) illustrates a method for broadcasting movies within channels of a wide band network by breaking the communications path into a number of logical channels and breaking each movie up into a number of segments of increasing size. The first segment of each movie is the smallest segment is transmitted in sequence over the first logical channel and repeated. The second segment of each movie which is proportionately larger than the first segment of each movie is transmitted in sequence over the second logical channel and repeated. This is repeated for the total number of segments which equals the total number of logical channels. The segments are broadcast in such a way that, once the first segment is received at a client location, the subsequent segments are also received in time, so that the movie can be viewed continuously.

U.S. Pat. No. 5,973,679 (Abbott, et al.) describes an indexing method for allowing a viewer to control the mode of delivery of program material. By mapping from time to data position, data delivery can begin at any selected time in the program material. The indexing method also provides for controlling data delivery to begin at the beginning of a frame of data. A synchronizing method is provided to minimize a time offset between audio and video data, particularly in environments using groups of pictures.

U.S. Pat. No. 5,996,015 (Day, et al.) describes a method of delivering seamless and continuous presentation of multimedia data files to a target device by assembling and concatenating multimedia segments in memory. The provides a multimedia server connected in a network configuration with client computer systems. The multimedia server further includes various functional units which are selectively operable for delivering and effecting the presentation of multimedia files to the client such that a plurality of multimedia files are seamlessly concatenated on the fly to enable a continuous and uninterrupted presentation to the client. In one example, client selected video files are seamlessly joined together at the server just prior to file delivery from the server. The methodology includes the analog to digital encoding of multimedia segments followed by a commonizing process to ensure that all of the multimedia segments have common operating characteristics. A seamless sequential playlist or dynamically created playlist is assembled from the selected and commonized segments and the resources needed to deliver and play the playlist are reserved in advance to assure resource availability for continuous transmission and execution of the playlist. At a predetermined point prior to an end point of each selected multimedia segment, the next selected segment is initialized and aligned in memory in preparation for a seamless switch to the next segment at the end of a previous segment, thereby providing a seamless flow of data and a continuous presentation of a plurality of selected multimedia files to a client system.

U.S. Pat. No. 5,608,448 (Smoral, et al.) describes a hybrid architecture for a video on demand server. The processing requirement at each computing element in a video server for a video on demand (VOD) system is reduced to only those needed for VOD, resulting in a less expensive processor with less memory and, hence, lower cost. A hybrid video server architecture combines the features of massive parallel processor (MPP) and workstation designs. Since it is not necessary to run a parallel relational database program in order to accomplish VOD data distribution, a unique type of switch element that is well matched to the VOD server problem is employed. By matching this switch element technology to an appropriate data storage technique, a full featured, responsive VOD server is realized.

SUMMARY OF THE INVENTION

An object of this invention is to provide a video data object distribution system where the video data objects are segmented to facilitate transfer of the video data objects.

Another object of this invention is to provide a video data object distribution system where a first segment of a video data object is transferred to a client system from a data file server and the first segment begins to be streamed for viewing prior to completion of the transfer of the first data object.

Further, another object of this invention is to provide a video data object distribution system where video data objects are sequentially fetched to provide isochronous viewing of the video data object.

Still further, another object of this invention is to provide a video data object distribution system where segments of data are hierarchically cached in data file servers such that a data file server is able to fetch segments of video data objects from any level of the network of the video data object distribution system.

Even further, another object of this invention is to provide a video data object distribution system having a control protocol to control transfer of the segments video data object and maintain sequential order of the video data object for streaming.

To accomplish at least one of these objects, a video object distribution system for transfer of video data objects includes a network of digital data file servers. The network of digital data file servers are in communication with at least one client system for the transfer of the video data objects to the client system. A scheduling apparatus schedules the transfer of the video data objects from the digital data file servers to the client system.

The scheduling apparatus has a file segmenting device that variably and dynamically segments video data objects within the digital data file servers. The video data objects are segmented dependent upon an available transfer bandwidth, a predicted request loading, and an actual request loading. A client streaming device within the client begins transfer of a first segment of the video data object to the client system such that the client system begins streaming of the video data object prior to reception of a totality of the first segment.

An ordered sequential transfer device orders and sequentially transfers segments of the video data object to the client system. The ordered sequential transfer device further assigns a bandwidth to the transfer to prevent simultaneous transfer of all segments of the video data object so as to allow transfer of the video data objects to multiple systems. A preemption device causes the cessation of the transfer of a first video data object and allows transfer of a second video data object that is more urgent than the first video data object. The preemption device allows persistent video data object transfer of the first digital video data object without resending the first digital video data objects.

A hierarchical caching controller copies segments of any of the video data objects from a central distribution server to any of the network of data file servers. The caching controller selects scheduling of transfers from the central distribution server to any of the network of data file servers or from on data file server within the network of data file servers.

To allow the streaming while fetching of the first segment of a the video object, the transfer bandwidth of the segments of the video data objects is a greater than the transfer bandwidth of the client system to accept and stream the digital video data objects.

The preemption device controls the transfer of segments of video data objects to optimize the usage of the transfer bandwidth within the network of digital data file servers first assigns a priority to each of the video data objects with in the data file servers. Upon request of a segment of a video data object by the client, the preemption device examines whether the transfer bandwidth is sufficient to transfer the requested video data object. If the bandwidth is not sufficient, the preemption device then determines if the priority of the requested video data object supercedes that of any video data object being transferred. If the priority of the requested video data object does not supercede that of any video data object being transferred, the preemption device schedules transfer for the requested video data object to a later time. Upon completion of the transfer of one of the video data objects being transferred, the preemption device dispatches the transfer the requested video data object. If the priority of the request video data object supercedes that of any video data object being transferred, The preemption device initiates a cessation of transfer of on video data object being transferred having the priority that is superceded by the priority of the requested video data object. When the transfer of the video data object has stopped, the preemption devices dispatches the transfer of the requested video data object. Upon completion of the transfer of the requested video data object, the video data object that had ceased transfer is restarted, preferably from the point within the video data object at which it was stopped.

The scheduling apparatus receives a request for at least one portion of at least one video data object and if the video data object is not segmented the file segmenting device segments the video data object. The hierarchical caching controller then copies the segments of the video data object to caches within the digital data file servers. The scheduling apparatus then determines the locations of the cached segments of the requested video data object within the digital data file servers. The scheduling apparatus determines those locations within the a network of digital data file servers containing the cached segments of the requested video data object those that are able to transfer the requested segments efficiently. The scheduling apparatus then creates a schedule table describing a time at which the requested segments are to be dispatched. At the time, the scheduling apparatus dispatches the segments to the client systems.

In the scheduling apparatus, if the request for a segment is a pull request, it is initiated by the client server to acquire the segment from the data file servers. Alternately, if the request for a segment is a push request, it is initiated by a distributor to send the segment to the client server.

The flow of packets within one segment being transferred to the client system is controlled by first receiving one of the packets and determining if the packet is in correct order relative to any previously received packets. If the packet is not in the correct order, the client server requests a resend of the packet not received in order. Those packets received but out of order are then buffered and the next packet is received. The client server then determines if the next packet is the missing packet not received in order. If the next packet is the missing packet, the next packet and any packet received out of order in correct order are stored and the client server then requests sending of remaining packets of the segment.

The flow control of the segments of the video data object is implemented as a flow control protocol that includes the following commands:

1. A send one packet command requesting the data file server containing the segment to send a single packet of the segment.
2. A send packets continuously command requesting the data file server containing the segment to send packet continuously.
3. A send a set of packet command requesting the data file server containing the segment to send a certain number of packets of the segment.
4. A stop sending command requesting the data file server to cease sending the packets.
5. A resend packets command requesting the data file server to stop send current packets and send specified packets.
6. A file size command requesting the data file server to provide the client system with a file size of the segment.
7. A setup communication command to establish communication parameters including packet size for a fixed packet size and algorithm parameters for a variable packet size.

Preferably the segments of the video data objects are transferred using user data gram protocol. The video data objects segments are ordered to permit isochronous transfer of the digital video objects to the client systems.

BRIEF DESCRIPTION OF THE DRAWINGS

FIG. 1 is a diagram of the transfer of files on a digital communications network of the prior art requiring minimal latency.

FIG. 2 is a diagram of the transfer of files on digital communications network of the prior art illustrating isochronous file transfer.

FIG. 3 is a diagram of a distributed computer network system illustrating replication of files in caches of the prior art.

DETAILED DESCRIPTION OF THE INVENTION

Figure 4:
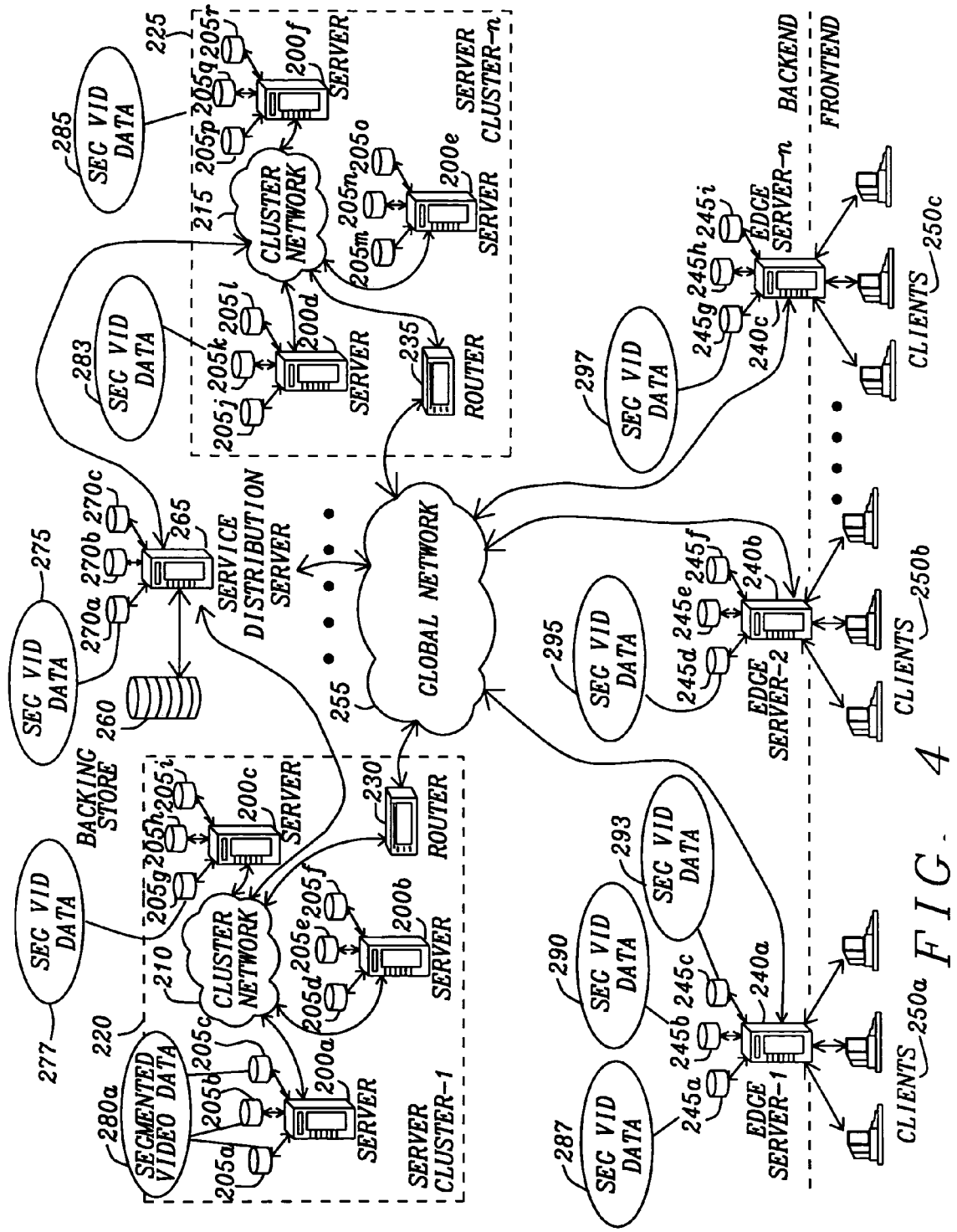
FIG. 4 is a diagram of a distributed system illustrating fetching while streaming of files of this invention.

Refer now to FIG. 4 for a description of a video distribution system of this invention. The client computing systems 250a, 250b, and 250c are connected through a communications link to an edge server 240a, 240b, and 240c. Each edge server 240a, 240b, and 240c acts as an interface for the client computing systems 250a, 250b, and 250c to a global communications network 255. The edge server 240a, 240b, and 240c are at the boundary between the "front-end" and the "backend" of the video distribution system. The front-end being the client computing systems 250a, 250b, and 250c that are the terminal points whereby the users can access the video distribution system. Further the edge server 240a, 240b, and 240c are generally internet service providers to which the client computing systems 250a, . . . , and 250c are in communication.

The backend of the video distribution system has server systems 200a, . . . , 200f that are grouped together to form server clusters 220 and 225. The server clusters 220 and 225 are respectively interconnected together through the cluster networks 210 and 215. The router 230 provides an interface for the server cluster 1 220 to the global communication network. Likewise, the router 235 provides an interface for the server cluster n 225 to the global communication network 255.

A service distribution server 265 is used to introduce new contents in the a video distribution system of this invention. Once a new video data file is available, a media distributor uses this service to propagate the title to different service regions of a geographically distributed system. The distribution server 265 consists of four distinct components. A distribution center, which is a remote service, is used by media distributors to push new video data files to regional server systems 200a, . . . , 200f. A distributor console, a web based remote graphical user interface (GUI), is used to specify locations and contents to be pushed to remote server systems 200a, . . . , 200f. A set of asset managers, which are local to regional server systems 200a, . . . , 200f, is responsible for managing and tracking contents in the regional server systems 200a, . . . , 200f. A set of asset databases, one database per regional server systems 200a, . . . , 200f, which stores the meta data for the available contents (video data files) in that regional server systems 200a, . . . , 200f. Asset managers use this database to keep track of local video data files. Multiple asset managers can share one asset database.

The service distribution server 265 provides the central gateway, content distribution, billing, hierarchical clustered parallel processing system configuration, admission, and title services. A backing store 260 is in communication with and controlled by the service distribution server 265 to maintain a central repository of all video content to be distributed by the video distribution system through the hierarchical clustered parallel processing system. Each of the server clusters 220 and 225 of networked server systems 200a, . . . , 200f will have a cluster supervising processor or group leader that will locally provide the gateway, content distribution, billing, hierarchical clustered parallel processing system configuration, admission, and title services.

A media distributor uses a distributor console to schedule distribution of new media data objects (video data files) to the video distribution system of this invention. The new video data files may reside in a tertiary storage or backing store 280 such as a robotic DVD associated with the service distribution server 265. The media distributor specifies when to push the title, the list of target regional sites, and the textual meta data related to the video. Among other things, the meta data of a title will possibly contain information required to categorize it as well as a set of searchable strings which can be used to search the content of the video data files. The distributor console connects with the remote service distribution server 265 and delivers the schedule. The distributor console contacts the asset managers in the specified target server systems 200a, . . . , 200f, and schedules the delivery of the new content. Once a server system 200a, . . . , 200f, receives the new video data file, it first stores the content in any available space in a local disk. Then, it updates the asset database with the information on the new video data file (including the received meta data on the video data file). If it does not have any available space, it replaces an old video data file using a programmed policy.

The gateway service is provided by the service distribution server 265 is the central point of contact for incoming requests to the video distribution system from the client computing systems 250a, 250b, and 250c. When a client computing systems 250a, 250b, and 250c requests a video data file (on demand) or join a broadcast (multicast) of a video data file, it first contacts the gateway server. The gateway service within the service distribution server 265 maintains an updated list of the server systems 200a, . . . , 200f in the system. Based on the location of the client computing systems 250a, 250b, and 250c and the type of request, it routes the request to the appropriate server systems 200a, . . . , 200f.

A large-scale system containing thousands of video data files must offer an efficient and easy to use content management service to the client computing systems. Such a content management service includes capabilities to add/delete, categorize, and browse video data files and is provided by the title server. The service distribution server 265 provides the title service provide content management services to client computing systems 250a, 250b, and 250c. Client computing systems 250a, 250b, and 250c, then, browse video data file in the service distribution server 265. In a geographically distributed broadband a video distribution system of this invention, the group leader of the server clusters 220 and 225 may alternately provide the title service, each for a service region. The gateway service will route the client computing systems 250a, 250b, and 250c requests to appropriate group leader of the server clusters 220 and 225 or the service distribution server 265 to perform the title service based on the location of the client computing systems 250a, 250b, and 250c.

Based on the client computing systems 250a, 250b, and 250c request (browsing by category, or searching using a string), the title service queries the asset database, and creates a list of video data files for the client computing systems 250a, 250b, and 250c to browse. The title service uses aggressive caching techniques to improve the performance of the query. When new information is added in the asset database, the cache in the provided by title service is invalidated.

It is sometimes possible for a title service to have information on a video data file, which is not wholly available in the local storage, for various reasons. Portions of the video data file may have been replaced because the asset manager needed space for a new video data file, or only a portion of a video data file was propagated from the service distribution server 265. Once a client computing systems 250a, 250b, and 250c requests such a video data file, the server systems 200a, . . . , 200f fetches the video data file to the local storage 205a, . . . , 205r. The server systems 200a, . . . , 200f allocates free space in the local storage 205a, . . . , 205r possibly by replacing a portion of a resident video data file. The server system 200a, . . . , 200f contacts the service distribution server 265 providing the name of the video data file and the remaining portion of the video data file. Once the service distribution server 265 is ready, the server system 200a, . . . , 200f fetches the remaining portion of the video data file, stores it in the allocated free space, and updates the asset database.

Once user of a client computing systems 250a, 250b, and 250c selects a video data file to be viewed, it contacts the service distribution server 265 or a group leader of the server clusters 220 and 225 to provide the admission service, which based on the bandwidth requirements and the file location of the video data file, assigns a video server systems 200a, . . . , 200f from the server clusters 220 and 225.

The admission service provides a set of mechanisms which are used to implement different policies for load balancing. The admission service maintains a cluster topology, a disk usage table, a node usage table, and a cluster map. The cluster topology maintains the connection information of the cluster. It itemizes a list of server systems 200a, . . . , 200f of a server clusters 220 and 225, which can access any of the disks. The cluster topology contains the server systems 200a, . . . , 200f identification that is the mount point where a disk 205a, . . . , 205r is mounted, and the access status of the disk 205a, . . . , 205r.

The disk usage table maintains the capacity (maximum data rate in Mbps) and the current load (data rate in Mbps) for each disk 205a, . . . , 205r in the server clusters 220 and 225. The node usage table maintains the streaming capacity (maximum data rate in Mbps) and the current load for each node in the server clusters 220 and 225. The server clusters 220 and 225 maintains an up to date list of network address (internet protocol address), port and the status of the important server system in the distribution system, and it maintains a list of server systems 200a, . . . , 200f in the server clusters 220 and 225, their network addresses and their status. A server system 200a, . . . , 200f can be in one of two states: active or Live (L) and Failed or Dead (D). Additionally, the admission service maintains a supporting data structure, required to provide fault tolerance and authenticated access to the server clusters 220 and 225. The data structure maintains a table containing the list of active sessions per server system 200a, 200f, and a similar table for active sessions per disk 205a, . . . , 205r.

The configuration service provided by the group leader of the server clusters 220 and 225 allows an administrator to define and to configure server clusters 220 and 225, and the distributed server installations. It maintains an up-to-date information of the distributed installation using a periodic monitoring mechanism and asynchronous update events from the server systems 200a, . . . , 200f and edge server 240a, 240b, and 240c in the system.

The service distribution server 265 or the group leader of the server systems of the server clusters 220 and 225 monitors the available transfer bandwidth, a predicted request loading, and an actual request loading for each of the disks 205a, . . . , 205r and disks 245a, . . . , 245i. The service distribution server 265 or the group leader of the server systems of the server clusters 220 and 225 to variably and dynamically segments video data objects retained in the backing store 260 and transfers the segments 275, 277, 280, 283, 285, 287, 290, 293, 295, and 297 to an appropriate disk 205a, . . . , 205r and disk 245a, . . . , 245i. The segment 280 is stored to disk 205a, 205b, and 205c in a fashion to stripe the segment. The segments 275, 277, 280, 283, 285, 287, 290, 293, 295, and 297 are assigned to their location to provide a most efficient or nearest location of the segments 275, 277, 280, 283, and 285 to their destination edge server 240a, 240b, and 240c. The segments 287, 290, 293, 295, and 297 are transferred to the disks 245a, . . . , 245i of the edge servers 240a, 240b, and 240c for streaming to the client systems 250a, 250b, and 250c.

This invention provide for overlapping the streaming and fetching of broadcast quality video data using heterogeneous and dynamically optimized segmentation sizes. This is accomplished through the implementation of the following elements:

1. Streaming While Fetching of Video Objects.
2. Ordered sequential transfer of segments of the video data object to the client system.
3. User Datagram Protocol (UDP) Based Video Object Fetch Protocol,
4. A Need Based Hierarchical Caching of Video Objects.
5. Preemptive Scheduling of Video Object Transfers.

In order to overlap video viewing and fetching the video data object is divided into segments 275, 277, 280, 283, 285, 287, 290, 293, 295, and 297. These segments 275, 277, 280, 283, 285, 287, 290, 293, 295, and 297 must be fetched and delivered in order or the video playback will not be properly ordered. For this reason ordered sequential fetch is implemented. A transfer bandwidth that is greater than that required for streaming of the video data object to the client systems 250a, 250b, and 250c and small enough to support a large number of requests is associated with each sequential fetch of a segment 275, 277, 280, 283, 285, 287, 290, 293, 295, and 297. In this way the number of simultaneous fetch requests can be limited to insure that the streaming of video is not interrupted by the transfer bandwidth limitations of the network from the location of the segments 275, 277, 280, 283, 285, 287, 290, 293, 295, and 297 of the video data objects.

Upon receiving a portion of a segment 275, 277, 280, 283, 285, 287, 290, 293, 295, and 297, the edge server 240a, 240b, and 240c begins to stream the video file to the client system 250a, 250b, and 250c. The file system of the edge server 240a, 240b, and 240c may be able to begin streaming on command or if the file server is not capable of simultaneous reading from and writing to a file, a pseudo-end-of-file must be inserted to the file to trick the file system into believing the file is complete and is able to be read.

Figure 5:
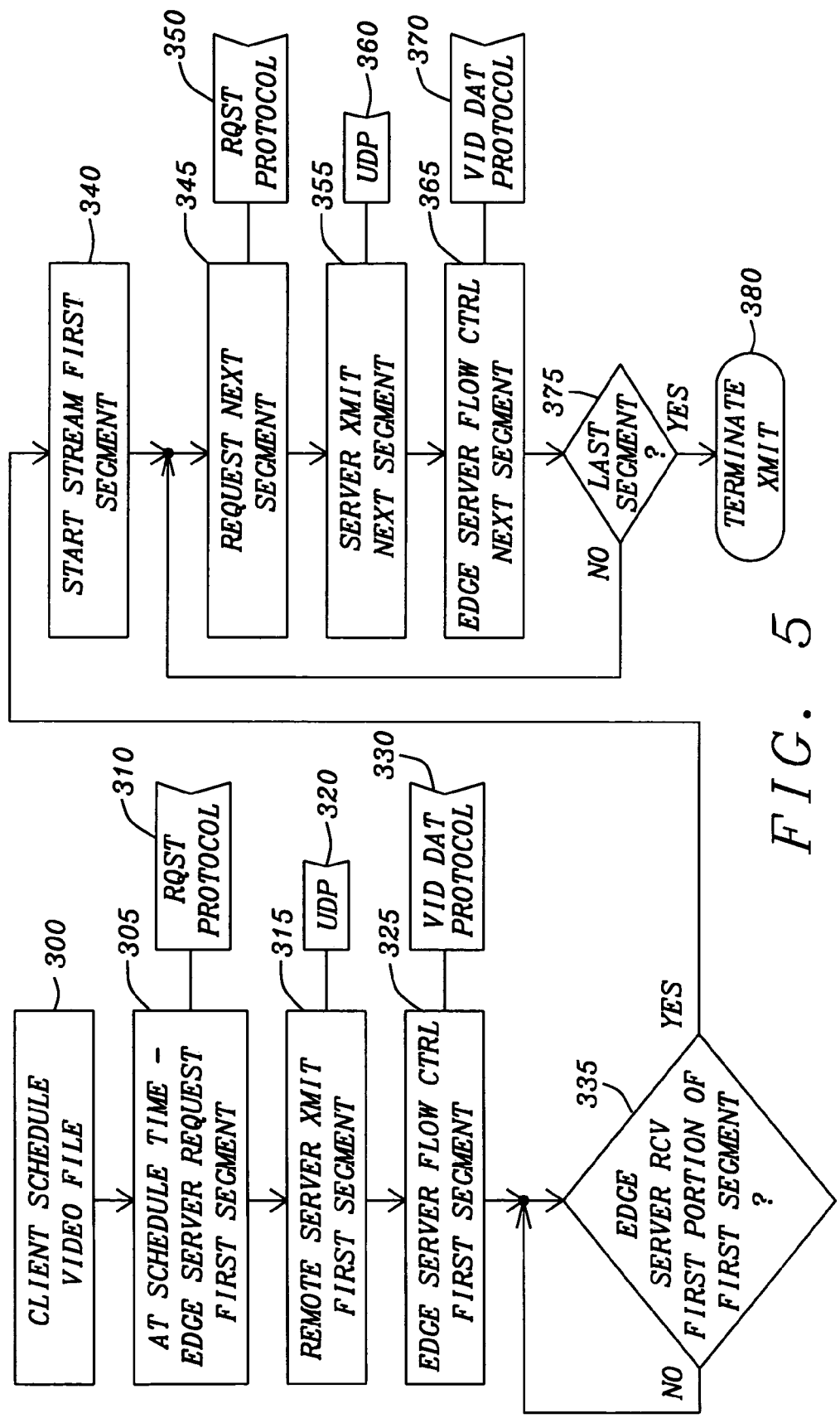
FIG. 5 is flowchart of the method for streaming while fetching of data files of this invention.

Refer now to FIG. 5 for a discussion of the method of transfer of a segment with streaming while fetching of the video segment of this invention. A client system 250a, 250b, and 250c of FIG. 3 selects and schedules (Box 300) a video data object for viewing. At the scheduled time, the edge server 240a, 240b, and 240c requests (Box 305) a first segment of the scheduled video data object. The request (Box 305) uses a request protocol 310 that maybe a Transmission Control Protocol (TCP), User Datagram Protocol (UDP), or Real-time Transport Protocol (RTP), or hypertext transmission protocol (HTTP) common in network communications. The remote server that is either one of the server systems 200a, . . . , 200f or the edge server 240a, 240b, and 240c requests (Box 315) transfer of the first segment of the scheduled video data object using a UDP protocol 320 to transfer the individual packets of the first segment. The edge server 240a, 240b, and 240c provides (Box 325) a flow control protocol to correctly acquire the packets of the first segment in their correct order. The packets 330 of the first segment are transferred using one of the TCP, UDP, RTP, or HTTP protocols.

File systems generally do not have enough buffer size to buffer an entire video data object and therefore the streaming must begin to prevent interruption of the playing of the video data object. The edge server 240a, 240b, and 240c monitors (Box 335) the amount of the requested segment and upon receiving a specific portion of the request segment of the video data object, starts streaming (Box 340) the first segment for processing (viewing) by the client system 250a, 250b, and 250c.

The edge server 240a, 240b, and 240c continues to receive the remaining packets of the first segment and requests (Box 345) the next segment of the video data object using the request protocol 350. The request protocol is the same protocol as the protocol 310 employed to request the first segment. The remote server begins transmission (Box 355) of the next segment using the UDP protocol 360 and the edge server 240a, 240b, and 240c provides (Box 365) flow control of the segment to ensure sequential reception of the segment of the video data object. The packets 370 of the segments of the video data object is transmitted using one of the TCP, UDP, RTP, or HTTP protocols as with the first packet 330. The edge server 240a, 240b, and 240c monitors (Box 375) the whether all the segments of the video data object are received and if all are not received request the sending (Box 345), transmitting (Box 355), and flow control (Box 365) of the next segment. Upon receipt of the last segment of the video data object the transfer is complete (Box 380).

Figure 6:
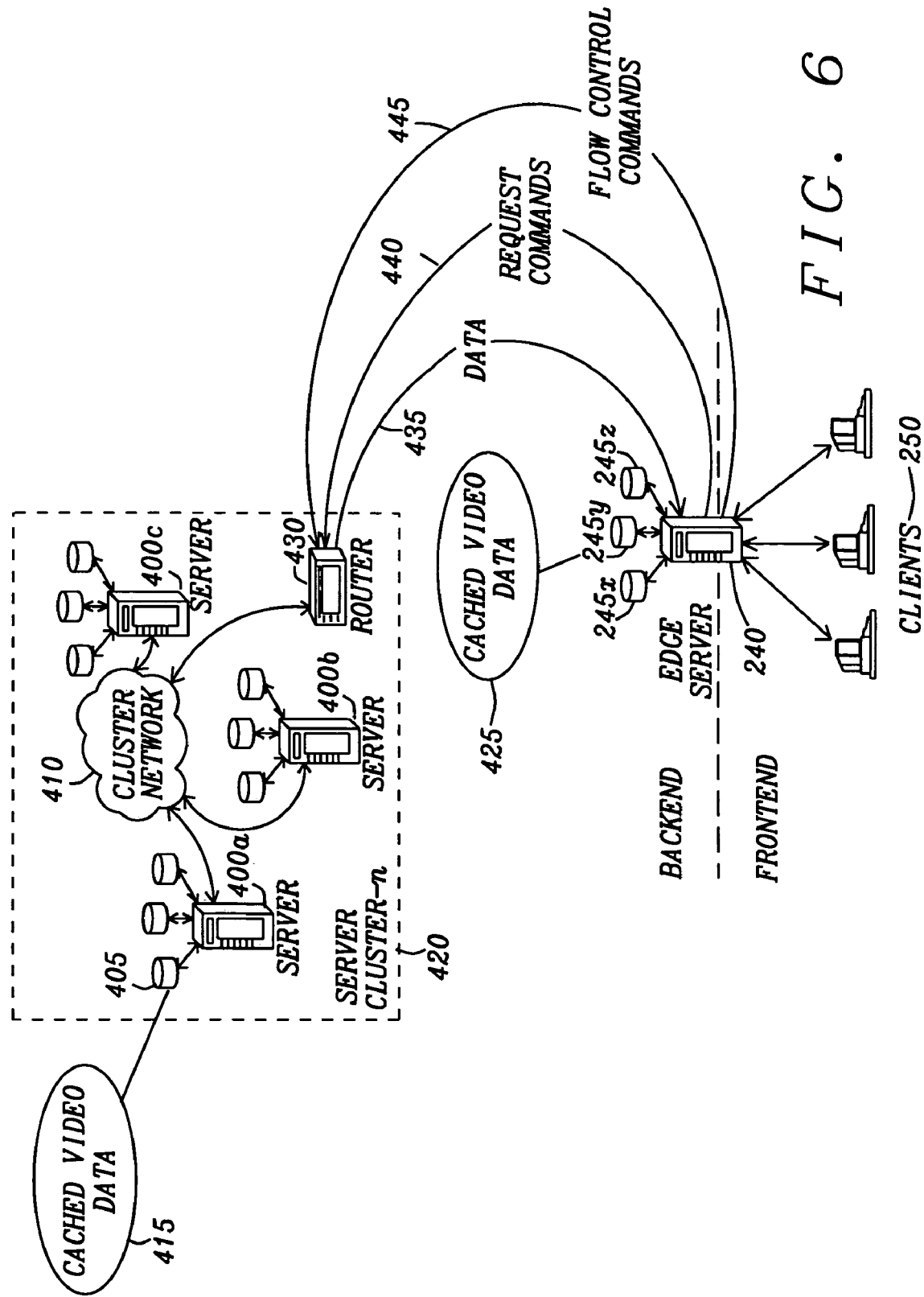
FIG. 6 is a diagram illustrating the communications of the fetch protocol of this invention.

Refer now to FIG. 6 for additional discussion of the method of transfer of a segment with streaming while fetching of the video segment of this invention, focusing on the system structure of the flow of the commands and data. The edge server 240 is connected to the client systems 250 to provide the interface to the distributed network computer system. The edge server 240 has the disks 245x, 245x, and 245z to provide file retention for the data and control objects. The edge server 240 is connected through the global network 255 of FIG. 4 to the server systems 400a, 400b, and 400c that form the server cluster 420. The router 430 provides the access to the global network 255 for the server cluster 420. The edge server 240 requests (Box 305) the segments of the scheduled video data object using a request protocol 440 that maybe a Transmission Control Protocol (TCP), User Datagram Protocol (UDP), or Real-time Transport Protocol (RTP), or hypertext transmission protocol (HTTP) common in network communications as described above. The request is routed to the server system 400a that has access to the disk 405 containing a cached copy of the desired segment 415 of the video data object. The server system 400a transfers the segment in video data packets 435 employing using one of the TCP, UDP, RTP, or HTTP protocols, as described above with the edge server 240 controlling the flow of the segments using the flow control commands 445 encoded using the UDP protocol.

For fetching a large video, protocols such as HTTP may consume too much processing time and network bandwidth. Protocols such as UDP meet the efficiency requirements of video streaming, but are not reliable (stateless) and packets may arrive out of order or not at all. To achieve the required efficiency a UDP (User Datagram Protocol) based fetch protocol, for example, may be used. In this protocol, the edge server 240 makes send and resend requests. The server system 400a does not maintain the status of the states of the edge server 240.

In the flow control as shown, the edge server 240 receives packets and writes them in order. If a packet number is missed, a resend command is transmitted. Before the missing packet is received, incoming packets are buffered until the buffer space is exhausted. After that packets are thrown away. When the missed packet is received, it is stored and subsequent buffered packets are stored. A send continuously command is sent, starting with the next needed packet. The stop command is sent by the edge server 240 when all packets have been received.

The protocol is implemented with the following commands:

| | |
|---|---|
| 1. Send one | Send one packet. |
| 2. Send | Send packets continuously starting with a given packet. |
| 3. Send set | Send a set of packets. |
| 4. Stop | Stop sending packets. |
| 5. Resend | Stop sending and send the specified packets. |
| 6. GetFileSize | Get the file size in bytes. |
| 7. Setup | Set up communication parameters such as packet size for a fixed packet size or algorithm parameters or a variable packet size. |

Figure 7:
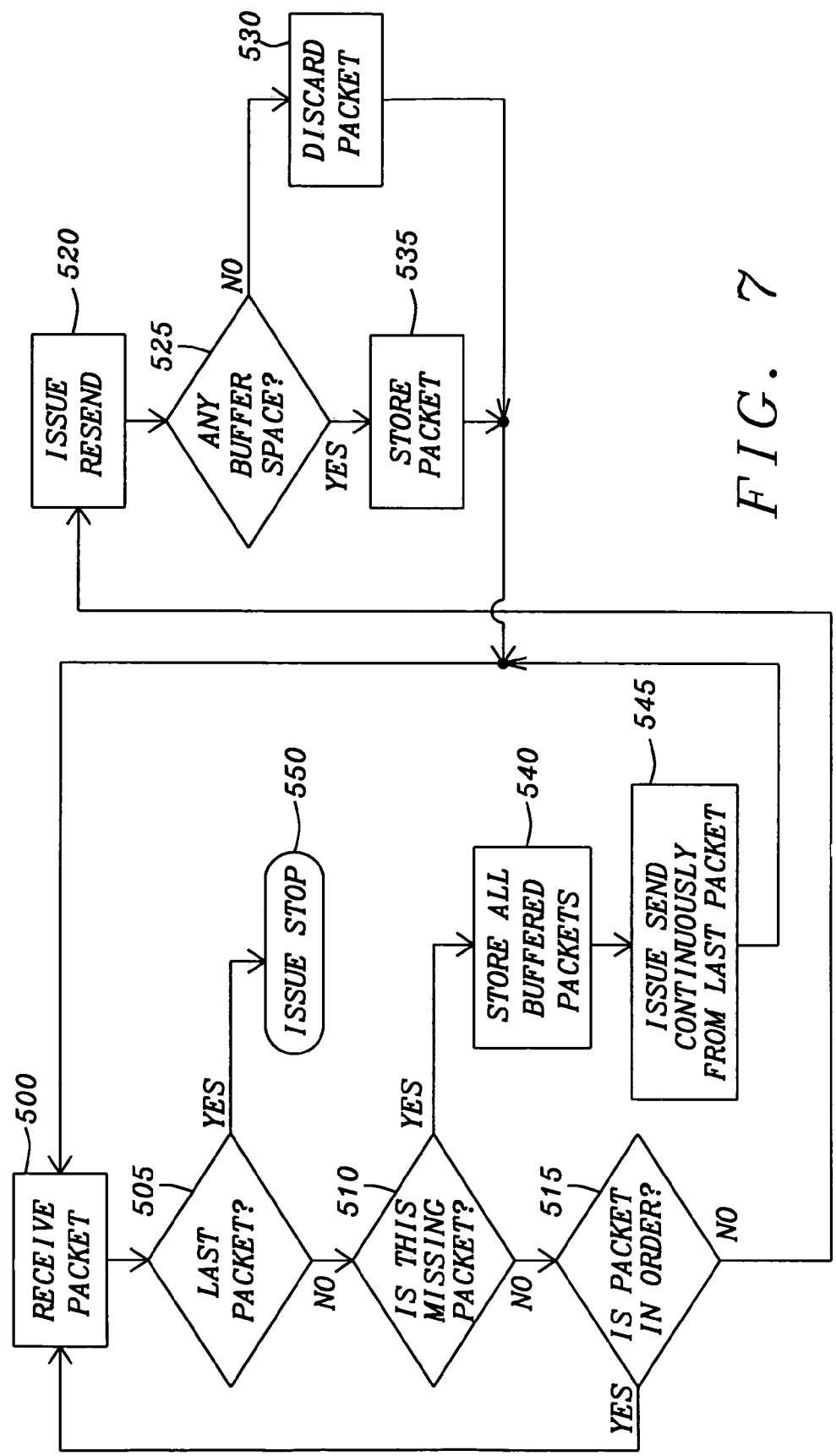
FIG. 7 is a flow diagram of the method of for transfer of data files of this invention.

Refer now to FIG. 7 for a discussion of the flow control procedure during transfer of a segment of a video data object from an server system 400a of FIG. 6 to an edge server 240. The edge server 240 monitors, upon the request for a segment of a video data object, receive a packet (Box 500) of the segment. The edge server 240 tests (Box 505) if the packet is the last packet of the segment and that all packets of the segment have been received. If it is not the last packet, the edge server 240 tests (Box 510) if the packet is a missing packet. If it is not a missing packet, the edge server 240 tests (Box 515) if the packet is in order and the next expected packet. If it is the next expected packet, the edge server 240 receives (Box 500) the next following packet. If it is not the next expected packet, the edge server 240 issues (Box 520) a resend command requesting the correct next packet to be sent. The edge server 240 determines (Box 525) if there is sufficient buffer space to accept the out-of-order packets. If there is sufficient buffer space, the edge server 240 stores (Box 535) the out-of-order packet. If there is not sufficient space, the edge server 240 discards the out-of-order packet. The edge server then receives (Box 500) the next following packet. If at the test (Box 510) for a missing packet indicates that the received packet is the missing packet, the missing packet and all the buffer packets are stored (Box 540) and the edge, server 240 issues a send command to continuously send packets starting last packet. The edge server 240 then receives (Box 500) the next packets until the last packet is determined (Box 505) to have been received. The edge server 240 then issue a stop command indicating that the segment has been successfully received.

Figure 8:
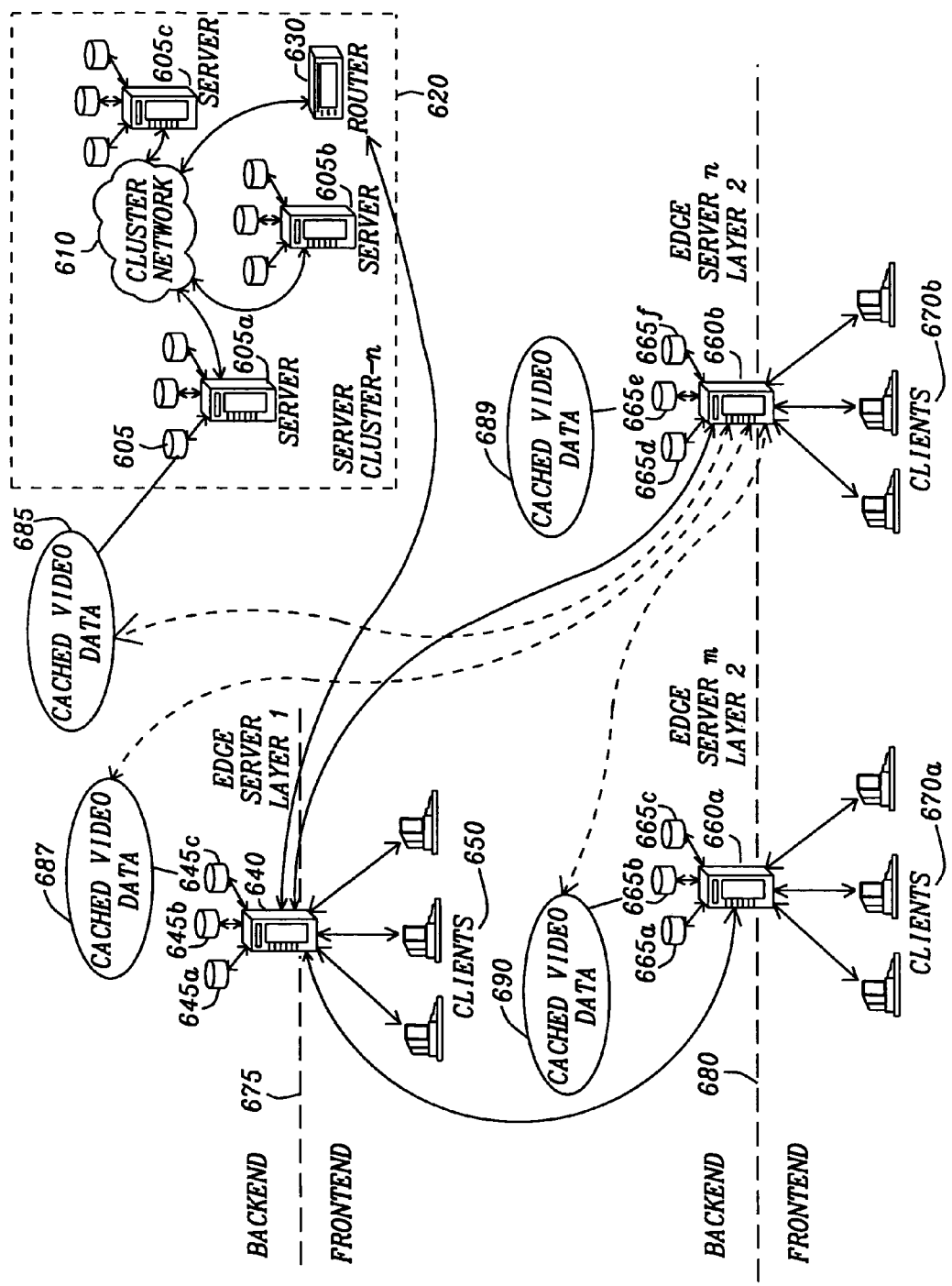
FIG. 8 is a system diagram illustrating hierarchical caching of data files of this invention.

A fetch of a video data object may be initiated by a viewer request from a client system 650, 670a and 670b as shown in FIG. 8. In an interactive system, the viewer may choose to seek forward, or terminate a viewing session. The fetch scheduler must honor such requests by canceling the current fetch operation and scheduling the appropriate operation to fulfill the request.

Caching techniques have been used to minimize network traffic. A simple caching model, as shown in FIG. 8, is to have a data center or a cluster 620 of server systems 600a, . . . , 600c and a number of edge severs 640, 660a, and 660b. When the number of edge severs 640, 660a, and 660b grows, however it may be necessary to employ a hierarchical caching system in which the edge severs 640, 660a, and 660b go to regional data centers for downloading data while regional centers go to master severs or service distribution servers 265 of FIG. 4 for their data.

The video distribution system of this invention employs a hybrid tree, peer to peer system. That is some edge severs 660a, and 660b have a virtual network connection to other edge servers 640 for access to the video data objects. The edge servers 660a, and 660b are thus virtually connected to the cluster server 620. The server cluster 620 is likewise structured as shown in FIG. 4 to be connected to a service distribution server 265 for access to the video data objects. To minimize the network traffic, the cluster servers 600a, 600b, or 600c or the edge severs 640, 660a, and 660b may go up the tree to "parent servers" or even "grandparent" or "parent sibling" to find required data or edge servers other "children of parent" may get data directly from other edge servers. Since peer to peer fetch is allowed, the edge severs 640, 660a, and 660b in the same region can form a distributed storage system where the segments of a video file are distributed over the edge severs 640, 660a, and 660b, thereby reducing data traffic to higher levels in the hierarchy. Thus a video object that is cached 685, 687, 689, and 690 is directly available 692, 694, 696, by any of the cluster servers 600a, 600b, or 600c or the edge severs 640, 660a, or 660b. The group leader of the cluster server 620 provides the title service that generates the listing of title locations while the admission service tracks the bandwidth allocation of the cluster servers 600a, 600b, or 600c or the edge severs 640, 660a, and 660b. edge sever 640, 660a, and 660b requiring the cached video data object 685, 687, 689, and 690, locates the "nearest" cluster servers 600a, 600b, or 600c or the edge severs 640, 660a, or 660b (parent, grandparent, parent sibling, edge server sibling). The "nearest" cluster 600a, 600b, or 600c or the edge severs 640, 660a, or 660b is the one with highest available bandwidth to deliver segment. The bandwidth is allocated between the edge sever 640, 660a, and 660b and the cluster servers 600a, 600b, or 600c or the edge severs 640, 660a, or 660b containing the desired segment and the segment is requested as described above.

Figure 9:
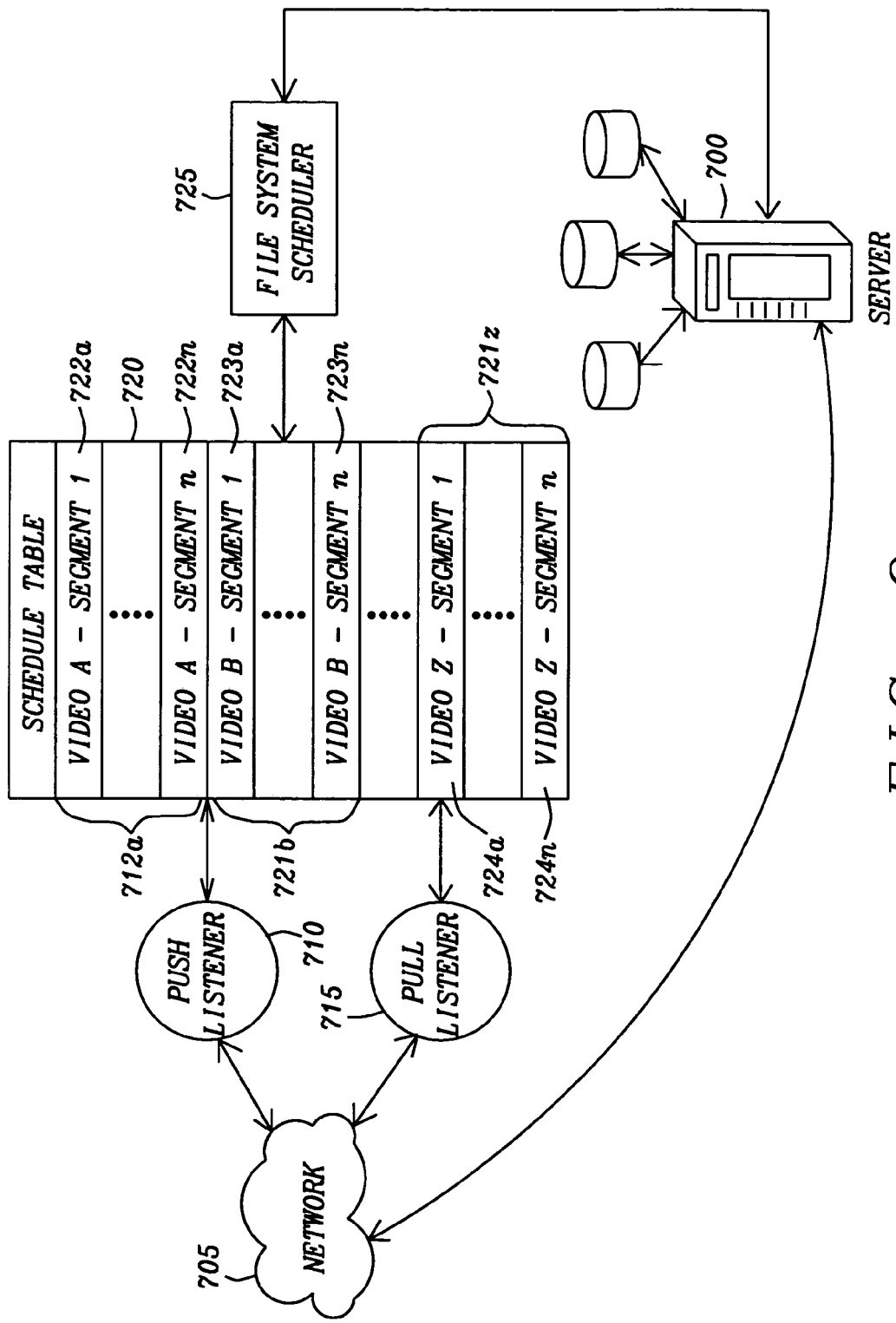
FIG. 9 is a flowchart of the method for flow control of packets of segments of data files transferred from the distributed computer network system to a client system of this invention.

Refer to FIG. 9 for a discussion of the scheduling of requests for segments of a data object of this invention. The structure of a file system within a server 700 is well known. A "push listener" 710 and a "pull listener" 715 are functions of the server 700 that "listen" to the requests and create "schedules" in the schedule table. A "file system scheduler" 725 periodically goes through the schedules in the schedule table 720 and check if any schedule needs to be evoked or put into sleep (deactivated). The schedule table defines the video data object 721a, . . . , 721z that are schedule to be transferred to a client system for viewing and the ordered schedules for each segment 723a, . . . , 723n is detailed. The time for the dispatch of each segment is noted for each segment. Prior to sending of each segment, the segment is deactivated or put to sleep. At the time it is to be sent it is activated or evoked for transfer.

For example, when an end viewer request viewing a video, the admission service of the service distribution server or the more local group leader of cluster of servers would make a query to the cache storage, which would make a fetch request to the pull listener 715 for those portions of the video that are not in the cache. Receiving a fetch request, the pull listener 715 finds out the segments involved, creates schedules for them, and assign predecessor file to each segment scheduled to facilitate sequential fetching. These segment schedules schedule 722a, . . . , 722n, 723a, . . . , 723n, and 724a, . . . , 724n are now entered into the schedule table 720 as sleeping or deactivated. The file system scheduler 725 queries the schedule table 720, and look into each schedule 722a, . . . , 722n, 723a, . . . , 723n, and 724a, . . . , 724n. Those segment schedules 722a, . . . , 722n, 723a, . . . , 723n, and 724a, . . . , 724n whose predecessor file has not been completed yet will remain SLEEPING. Since the schedule 722a, 723a, or 724a for the first segment does not have a predecessor file, it gets evoked, and starts fetching. Once it is fetched, it is marked DONE in the schedule table 720 (or simply removed from the schedule table 720.) When the file system scheduler 725 comes back the next time, it would find that the schedule 722a, . . . , 722n, 723a, . . . , 723n, and 724a, . . . , 724n for segment 2 already has its predecessor completed, and it would evoke that schedule.

A push listener 710 listens to "push orders" coming from the network. The "pusher" may be an operator using a remote console, or another edge server site that wants to publish some contents. Once a push listener 710 receives a fetch request, it performs the same actions as a pull listener 715—finding out the segments involved, creating the segment schedules 722a, . . . , 722n, 723a, . . . , 723n, and 724a, . . . , 724n, assigning the predecessors files, and entering into the schedule table 720. The purpose of having a push listener 710 and a pull listener 715 is to provide different ways of receiving fetch requests. The pull listener 715 listens to the cache storage's requests, and the push listener 710 listens to the network. Other types of listeners are also possible.

Subsequent request to the same segment will not be entered into the schedule table if a schedule already exists for that segment. Therefore, if more than one end viewers requested the same video, it is going to be fetched only once instead of multiple times.

If an end viewer did a "forward jump" where the viewer wants to go to, say, segment 5 while viewing segment 1, the pull listener 715 would be notified, and it would erase the predecessor file of segment 5, which will be evoked when the scheduler visits again.

The file system scheduler's 725 delay time (from visit to visit) is usually set to 1 or 2 seconds so that no interruption is necessary when new schedules are entered. If the file system scheduler's 725 delay time is configured to be longer than desired, an interruption mechanism needs to be programmed so that a fetch schedule may be evoked in time.

Figure 10:
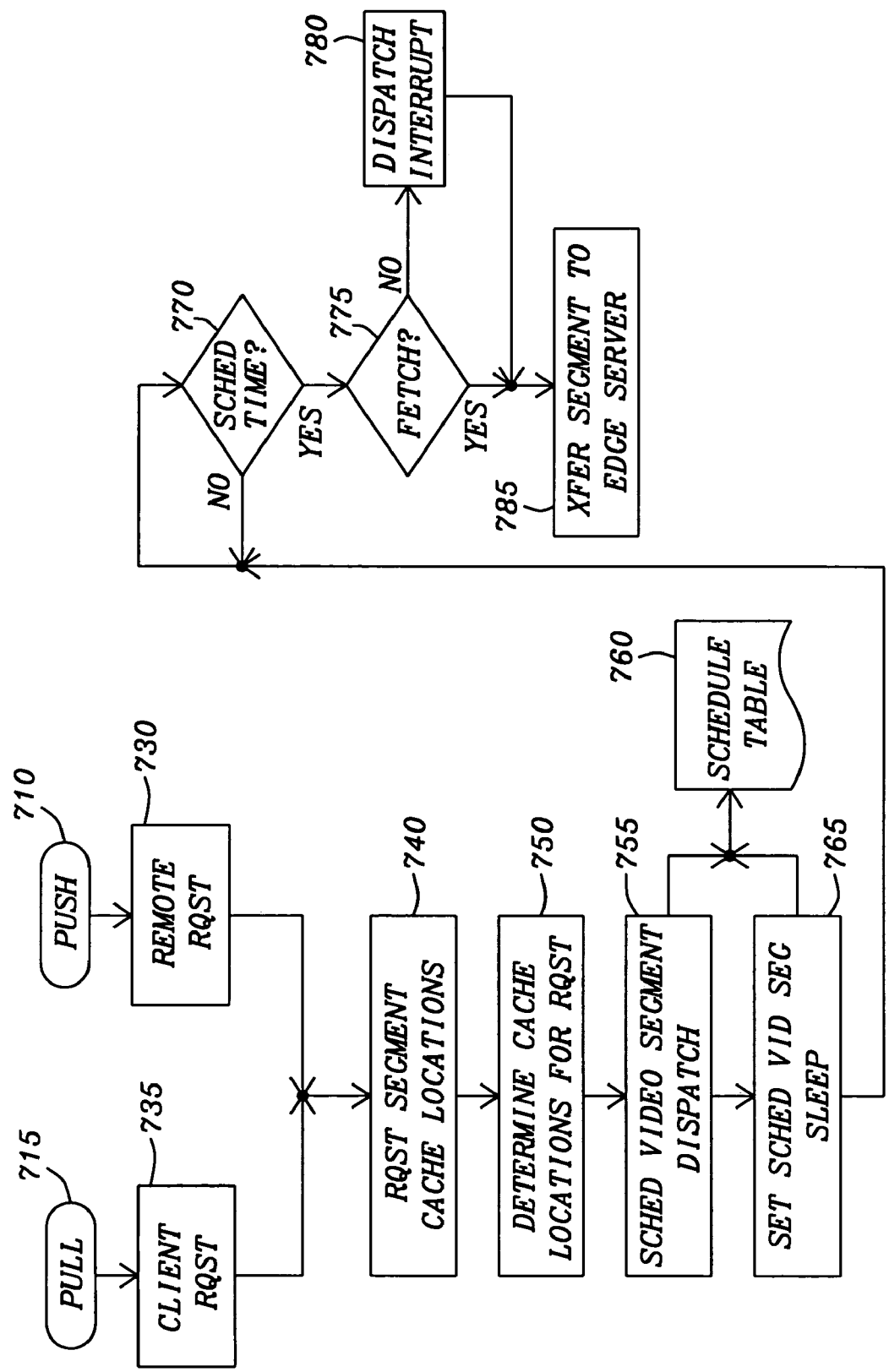
FIG. 10 is a flow diagram of the system structure to allow hierarchical caching of data files of this invention.

Refer now to FIG. 10 for a more detailed description of the sequential ordering of video data objects for transfer from distributed cache locations to an edge server and then to a client system for a user to process and view a data object. As described above the push listener 710 receives remote requests (Box 730) from remote from the network and the pull listener 715 receives requests Box 735) from the client system for the transfer of video data objects. The admission service of the service distribution server or the more local group leader of cluster of servers would make a request (Box 740) to the cache storage of the servers containing the segments of a listing of the cache locations of the segments of the video data object. The admission service transfers to the push listener 710 or the pull listener 715 which the determines (Box 750) the cache locations have the bandwidth and sufficiently close location to dispatch the segments of the video data object. The segments of the video data object are scheduled (Box 755) the time for dispatch of each segment and provide the listing of the predecessor files for each segment to insure sequential, ordered dispatch of the segments of the video data object. The scheduling of the segments with the listing of the predecessor files are placed in the schedule table (Box 760). The scheduling for those segments of the video data objects that are not be evoked is set (Box 765) to be deactivated or to sleep.

The file scheduling system periodically queries (Box 770) the table to determine if the scheduled time for dispatch of the segments has arrived. If the predecessor files are being dispatched, the next segment remains deactivated or in the sleep state. When the predecessor file is complete it is marked as done or is removed from the schedule table 760, the next segment is dispatched. When the file scheduling system examines (Box 770) to determine if a segment is to be dispatched, it then determines if the segment is fetched (Box 775). If the timing is correct the transfer of the segment is initiated (Box 785). Alternately, if the timing for the file scheduling system is too long and the time for the segment to be dispatched arrives there is a dispatch interrupt (Box 780) and the transfer of the segment is initiated (Box 785).

In order to meet the performance requirements of delivering multiple simultaneous video streams in segments, fetching video segments must be preemptible. This means that a given segment fetch may be paused or emptied in order to service another fetch operation. Preemption may occur if the number to segment fetch requests exceeds the available bandwidth or if a given fetch request has a higher priority than existing requests. Preemptive scheduling facilitates bandwidth sharing, and special delivery of urgent requests.

Figure 11:
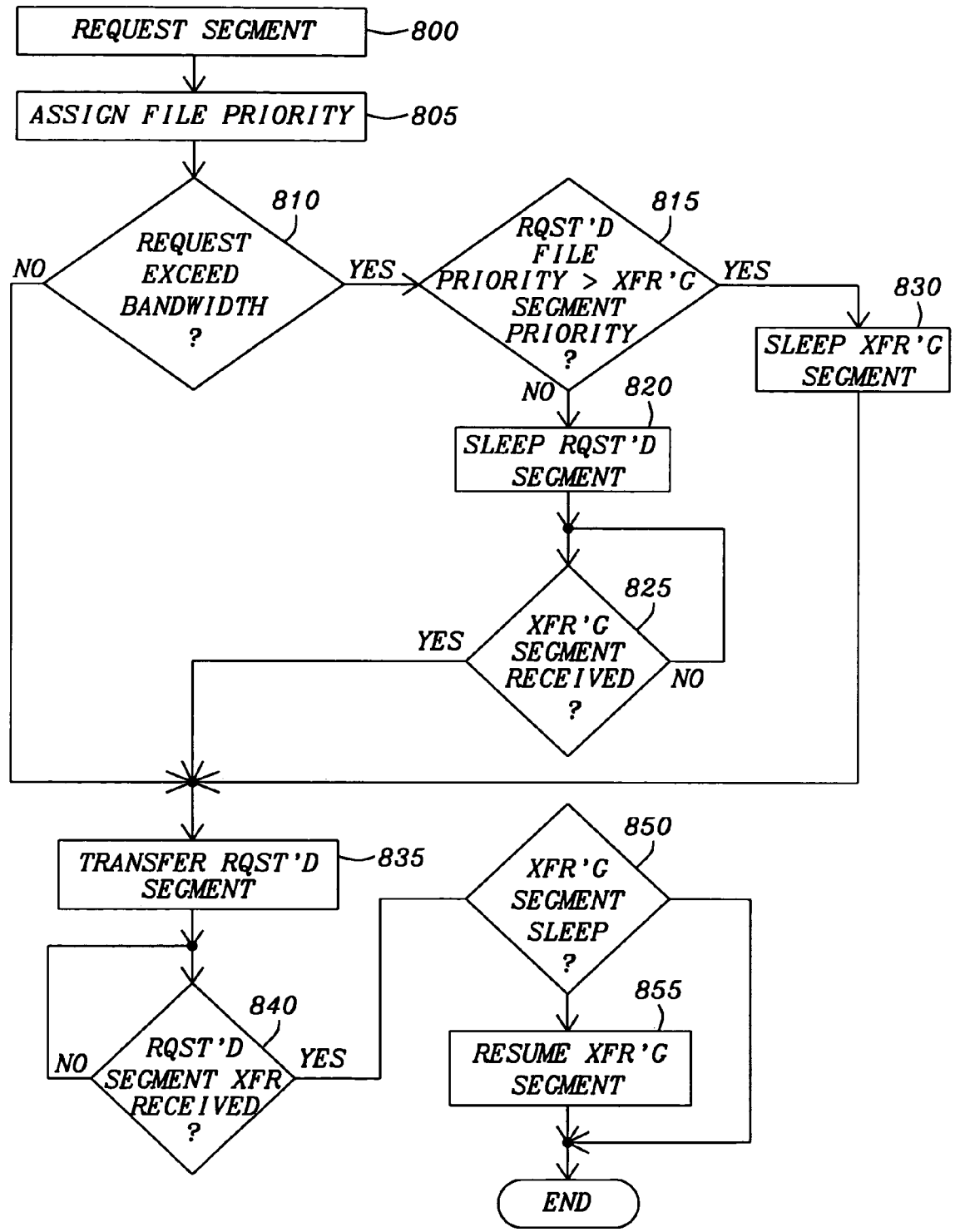
FIG. 11 is a flowchart for preemptive scheduling of segments of data files from distributed computer network systems to client systems of this invention.

Referring now to FIG. 11 for a discussion of the details of the preemptive scheduling. A client system requests (Box 800) the segments of the video data object. Each segment of a video data object is assigned (Box 805) a file priority class. The admission service of the admission service of the service distribution server or the more local group leader of cluster of servers would make a query to the cache storage to determine the transfer bandwidth requirements of the video data object and the transfer bandwidth available for the transfer. The transfer bandwidth requirements and the transfer availability are compared (Box 810) to determine if the transfer bandwidth required of the segments exceeds the transfer bandwidth availability. If the transfer bandwidth required of the segment does not exceed the transfer bandwidth availability, the requested segment of the video data object is transferred in an order, sequential fashion.

If the transfer bandwidth required of the segment is greater than the transfer bandwidth available, the priority class of the segment to be transferred is compared (Box 815) to the priority class of the segments being transferred. If the segment to be transferred has a preemptive class, the file scheduler stops transfer of other segments and places transferring segments in a deactivated or sleep state until the segment of the video data object with the preemptive class is transferred (Box 835).

If the requested segment to be transferred does not have the preemptive class greater than the segments of video data objects being transferred, the requested segment of the video data object is put in a deactivated or sleep state. The reception of the transferring segment of the video data object is monitored (Box 825) and upon completion of the transferring video data object, the requested segment of the video data object is transferred (Box 835).

The reception of the requested segment of the video data object is monitored (Box 840) and upon completion of the transfer of the segment of the video data object, it is determined (Box 850) if a previously transferring segment of the video data object is deactivated or in the sleep state. If not, the process is completed. If there is a previously transferring segment of a video data object, the previously transferring segment of the video data object is resumed (Box 855) and the preemptive scheduling is completed.

Other segments of the video data object or other video data objects having the same preemptive class may be transferred until the bandwidth limit of the file system or the network is reached. Any segments of the video data object or other video data objects having the same preemptive class that are required, after the bandwidth limit is reached, wait until the segments of the video data object or other video data objects having the same preemptive class are transferred. The operator assigns preemptive classes to file types. Generally files that are in progress of being streamed are given the highest priority.

Those files that are given a "regular" class must be deactivated or put in a sleep state and wait for all other segments of the video data object or other video data objects having a higher preemptive class to be transferred.

While this invention has been particularly shown and described with reference to the preferred embodiments thereof in particular a video data object distribution system, it will be understood by those skilled in the art that various changes in form and details for other digital data file distribution systems may be made without departing from the spirit and scope of the invention.

The invention claimed is:

1. A file distribution system for transfer of data objects comprising:
    a network of digital data file servers in communication with at least one client system for the transfer of the data objects to the client system;
    a scheduling apparatus for scheduling said transfer of the data objects from said digital data file servers to the client system, comprising:
        a file segmenting device to variably and dynamically segment data objects within said digital data file servers dependent upon an available transfer bandwidth, a predicted request loading, and an actual request loading;
        a client streaming device within said client to begin transfer of a first segment of said data object to said client system such that the client system begins processing of said data object prior to reception of a totality of said first segment;
        an ordered sequential transfer device to order and sequentially transfer segments of the data object to the client system and to assign a bandwidth to said transfer to prevent simultaneous transfer of all segments of the data object so as to allow transfer of the data objects to multiple systems;
        a preemption device to cease transfer of a first data object and allow transfer of a second data object that is more urgent than the first data object, whereby said preemption device allows persistent data object transfer of the first digital data object without resending said first digital data object; and
        a hierarchical caching controller to copy segments of any of the data objects from a central distribution server to any of the network of data file servers, whereby the caching controller selects scheduling of transfers from the central distribution server to any of the network of data file servers or from on data file server within the network of data file servers.

2. The file distribution system of claim 1 wherein the transfer at which the network of data file servers has a greater transfer bandwidth than the bandwidth of the client system to accept and process the digital data objects.

3. The file distribution system of claim 1 wherein the preemption device executes the steps of:
    assigning a priority to each of said data objects with in said data file servers;
    upon request of a segment of a data object by said client, examining whether the transfer bandwidth is sufficient to transfer said requested data object;
    if said bandwidth is not sufficient, determining if the priority of said requested data object supercedes that of any data object being transferred;
    if said priority of said requested data object does not supercede that of any data object being transferred, scheduling transfer for said requested data object to a later time;
    upon completion of the transfer of one of the data objects being transferred, transferring the requested data object;
    if said priority of said request data object supercedes that of any data object being transferred, ceasing transfer of said data object being transferred having the priority that is superceded by the priority of the requested data object;
    upon ceasing of said transfer of the data object, transferring the requested data object; and
    upon completion of the transfer of the requested data object, restarting said data object that had ceased transfer.

4. The file distribution system of claim 1 wherein said scheduling apparatus schedules a request executing the steps of:
    receiving a request for at least one portion of at least one data object;
    segmenting by the file segmenting device said data object;
    caching by said hierarchical caching controller said segments of said data objects within the digital data file servers;
    determining within said digital data file servers, locations of said cached segments of said requested data object;
    determining from those locations containing said cached segments those locations within the digital data file servers that are able to transfer said requested segments efficiently;
    creating a schedule table describing a time at which said requested segments are to be dispatched; and
    at said time, dispatching said segments to said client systems.

5. The file distribution system of claim 4 wherein said request for a segment is a pull request initiated by the client server to acquire said segment from the data file servers.

6. The file distribution system of claim 4 wherein said request for a segment is a push request initiated by a distributor to send said segment to said client server.

7. The file distribution system of claim 1 wherein the client streaming device controls the flow of packets within one segment being transferred to said client system by the steps of
    receiving one of said packets;
    determining if said packet is in correct order relative to previously received packets;
    if said packet is not in the correct order, requesting a resend of the packet not received in order;
    buffering said packet received but out of order;
    receiving a next packet;
    determining if said next packet is a missing packet not received in order;
    if said next packet is said missing packet, storing said next packet and any packet received out of order in correct order; and
    requesting sending of remaining packets of said segment.

8. The file distribution system of claim 7 wherein said segments of said data objects are transferred using user data gram protocol.

9. The file distribution system of claim 7 wherein said flow control is implemented as a flow control protocol comprising
- a send one packet command requesting the data file server containing said segment to send a single packet of said segment;
- a send packets continuously command requesting the data file server containing said segment to send packet continuously;
- a send a set of packet command requesting the data file server containing said segment to send a certain number of packets of said segment;
- a stop sending command requesting said data file server to cease sending said packets;
- a resend packets command requesting said data file server to stop send current packets and send specified packets;
- a file size command requesting said data file server to provide said client system with a file size of said segment; and
- a setup communication command to establish communication parameters including packet size for a fixed packet size and algorithm parameters for a variable packet size.

10. The file distribution system of claim 1 wherein said data objects are digital video data objects and said segments are ordered to permit isochronous transfer of said digital video objects to said client systems.

11. A video object distribution system for transfer of video data objects comprising:
- a network of digital data file servers in communication with at least one client system for the transfer of the video data objects to the client system;
- a scheduling apparatus for scheduling said transfer of the video data objects from said digital data file servers to the client system, comprising:
  - a file segmenting device to variably and dynamically segment video data objects within said digital data file servers dependent upon an available transfer bandwidth, a predicted request loading, and an actual request loading;
  - a client streaming device within said client to begin transfer of a first segment of said video data object to said client system such that the client system begins streaming of said video data object prior to reception of a totality of said first segment;
  - an ordered sequential transfer device to order and sequentially transfer segments of the video data object to the client system and to assign a bandwidth to said transfer to prevent simultaneous transfer of all segments of the video data object so as to allow transfer of the video data objects to multiple systems;
  - a preemption device to cease transfer of a first video data object and allow transfer of a second video data object that is more urgent than the first video data object, whereby said preemption device allows persistent video data object transfer of the first digital video data object without resending said first digital video data object; and
  - a hierarchical caching controller to copy segments of any of the video data objects from a central distribution server to any of the network of data file servers, whereby the caching controller selects scheduling of transfers from the central distribution server to any of the network of data file servers or from on data file server within the network of data file servers.

12. The video object distribution system of claim 11 wherein the transfer at which the network of data file servers has a greater transfer bandwidth than the bandwidth of the client system to accept and stream the digital video data objects.

13. The video object distribution system of claim 11 wherein the preemption device executes the steps of:
- assigning a priority to each of said video data objects with in said data file servers;
- upon request of a segment of a video data object by said client, examining whether the transfer bandwidth is sufficient to transfer said requested video data object;
- if said bandwidth is not sufficient, determining if the priority of said requested video data object supercedes that of any video data object being transferred;
- if said priority of said requested video data object does not supercede that of any video data object being transferred, scheduling transfer for said requested video data object to a later time;
- upon completion of the transfer of one of the video data objects being transferred, transferring the requested video data object;
- if said priority of said request video data object supercedes that of any video data object being transferred, ceasing transfer of said video data object being transferred having the priority that is superceded by the priority of the requested video data object;
- upon ceasing of said transfer of the video data object, transferring the requested video data object; and
- upon completion of the transfer of the requested video data object, restarting said video data object that had ceased transfer.

14. The video object distribution system of claim 11 wherein said scheduling apparatus schedules a request executing the steps of:
- receiving a request for at least one portion of at least one video data object;
- segmenting by the file segmenting device said video data object;
- caching by said hierarchical caching controller said segments of said video data objects within the digital data file servers;
- determining within said digital data file servers, locations of said cached segments of said requested video data object;
- determining from those locations containing said cached segments those locations within the digital data file servers that are able to transfer said requested segments efficiently;
- creating a schedule table describing a time at which said requested segments are to be dispatched; and
- at said time, dispatching said segments to said client systems.

15. The video object distribution system of claim 14 wherein said request for a segment is a pull request initiated by the client server to acquire said segment from the data file servers.

16. The video object distribution system of claim 14 wherein said request for a segment is a push request initiated by a distributor to send said segment to said client server.

17. The video object distribution system of claim 11 wherein the client streaming device controls the flow of packets within one segment being transferred to said client system by the steps of:
- receiving one of said packets;
- determining if said packet is in correct order relative to previously received packets;

if said packet is not in the correct order, requesting a resend of the packet not received in order;

buffering said packet received but out of order;

receiving a next packet;

determining if said next packet is a missing packet not received in order;

if said next packet is said missing packet, storing said next packet and any packet received out of order in correct order; and requesting sending of remaining packets of said segment.

18. The video object distribution system of claim 17 wherein said segments of said video data objects are transferred using user data gram protocol.

19. The video object distribution system of claim 17 wherein said flow control is implemented as a flow control protocol comprising a send one packet command requesting the data file server containing said segment to send a single packet of said segment;

a send packets continuously command requesting the data file server containing said segment to send packet continuously;

a send a set of packet command requesting the data file server containing said segment to send a certain number of packets of said segment;

a stop sending command requesting said data file server to cease sending said packets;

a resend packets command requesting said data file server to stop send current packets and send specified packets;

a file size command requesting said data file server to provide said client system with a file size of said segment; and a setup communication command to establish communication parameters including packet size for a fixed packet size and algorithm parameters for a variable packet size.

20. The video object distribution system of claim 11 wherein said video data objects segments are ordered to permit isochronous transfer of said digital video objects to said client systems.

* * * * *